United States Patent
Edward et al.

(10) Patent No.: US 11,504,901 B2
(45) Date of Patent: Nov. 22, 2022

(54) PIPE FORMING METHOD

(71) Applicant: M-Flow Technologies Limited, Abingdon (GB)

(72) Inventors: Giles Edward, Abingdon (GB); Richard Damon Goodman Roberts, Southampton (GB); Martin Peter William Jones, Chichester (GB); Luke Rumsey, Fareham (GB); John Brickwood, Southampton (GB); Milan Bujdoso, Portsmouth (GB)

(73) Assignee: M-Flow Technologies Limited, Abingdon (GB)

( * ) Notice: Subject to any disclaimer, the term of this patent is extended or adjusted under 35 U.S.C. 154(b) by 431 days.

(21) Appl. No.: 15/569,374

(22) PCT Filed: Apr. 28, 2016

(86) PCT No.: PCT/GB2016/051204
§ 371 (c)(1),
(2) Date: Oct. 25, 2017

(87) PCT Pub. No.: WO2016/174436
PCT Pub. Date: Nov. 3, 2016

(65) Prior Publication Data
US 2018/0297268 A1 Oct. 18, 2018

(30) Foreign Application Priority Data

Apr. 30, 2015 (GB) ..................................... 1507402

(51) Int. Cl.
*B29C 63/06* (2006.01)
*B29D 23/00* (2006.01)
(Continued)

(52) U.S. Cl.
CPC .............. *B29C 63/06* (2013.01); *B29C 51/12* (2013.01); *B29C 51/14* (2013.01); *B29C 70/32* (2013.01);
(Continued)

(58) Field of Classification Search
CPC ......... B29C 63/06; B29C 51/14; B29C 51/12; B29C 70/32; B29C 63/10;
(Continued)

(56) References Cited

U.S. PATENT DOCUMENTS

| | | | | |
|---|---|---|---|---|
| 3,949,045 A | * | 4/1976 | Hess | B29C 57/04 264/296 |
| 4,515,737 A | * | 5/1985 | Karino | B29C 48/09 264/477 |
| 5,415,079 A | | 5/1995 | Ching | |
| 5,428,896 A | * | 7/1995 | Auberon | B29C 33/52 29/888.09 |

(Continued)

FOREIGN PATENT DOCUMENTS

| | | |
|---|---|---|
| DE | 36 03 060 | 8/1987 |
| EP | 0 185 460 | 6/1986 |

(Continued)

*Primary Examiner* — Jacob T Minskey
*Assistant Examiner* — Caroline Beha
(74) *Attorney, Agent, or Firm* — Levy & Grandinetti

(57) ABSTRACT

A method for forming a composite fluid conduit includes providing an inner pipe having a variation in cross-section between at least two different longitudinal sections thereof and applying a fiber reinforced composite material to the inner pipe. In some disclosed examples the variation in cross section may be provided intermediate opposing ends of the inner pipe. In other disclosed examples the variation in cross section may be provided at an end region of the inner pipe.

25 Claims, 15 Drawing Sheets

(51) Int. Cl.
*B29C 51/14* (2006.01)
*B29L 23/00* (2006.01)
*B29C 57/04* (2006.01)
*B29C 63/10* (2006.01)
*B29K 105/06* (2006.01)
*B29C 70/32* (2006.01)
*B29C 51/12* (2006.01)

(52) U.S. Cl.
CPC .............. *B29D 23/00* (2013.01); *B29C 57/04* (2013.01); *B29C 63/10* (2013.01); *B29C 2949/08* (2022.05); *B29K 2105/06* (2013.01); *B29L 2023/00* (2013.01); *B29L 2023/22* (2013.01)

(58) Field of Classification Search
CPC ............ B29C 2049/0089; B29C 57/04; B29C 70/462; B29C 70/30; B29C 67/0014; B29C 63/12; B29C 57/005; B29C 57/02; B29C 57/10; B29C 53/00; B29D 23/00; B29D 23/001; B29L 2023/00; B29L 2023/22; B29K 2105/06; F16L 9/12
See application file for complete search history.

(56) References Cited

U.S. PATENT DOCUMENTS

| | | | | |
|---|---|---|---|---|
| 5,585,062 | A | * 12/1996 | Muramatsu | B29C 53/44 264/314 |
| 5,735,156 | A | 4/1998 | Yoshitomi et al. | |
| 6,053,214 | A | * 4/2000 | Sjoberg | F16L 11/15 138/134 |
| 9,050,759 | B2 | * 6/2015 | Boveroux | B29C 66/721 |
| 9,983,150 | B2 | * 5/2018 | Edward | G01F 1/74 |
| 2004/0256016 | A1 | * 12/2004 | Arima | B29D 23/001 138/126 |
| 2009/0050730 | A1 | 2/2009 | Pallini et al. | |
| 2014/0076479 | A1 | * 3/2014 | Bartel | B29C 53/04 156/73.1 |
| 2014/0182737 | A1 | * 7/2014 | Jones | G01N 22/00 138/177 |
| 2015/0053293 | A1 | * 2/2015 | Ophaug | B32B 3/20 138/140 |
| 2017/0043507 | A1 | * 2/2017 | Gobel | B29C 48/25 |

FOREIGN PATENT DOCUMENTS

| | | |
|---|---|---|
| GB | 1 365 834 | 9/1974 |
| JP | 2002-187214 | 7/2002 |
| KR | 2009-0015598 | 2/2009 |

* cited by examiner

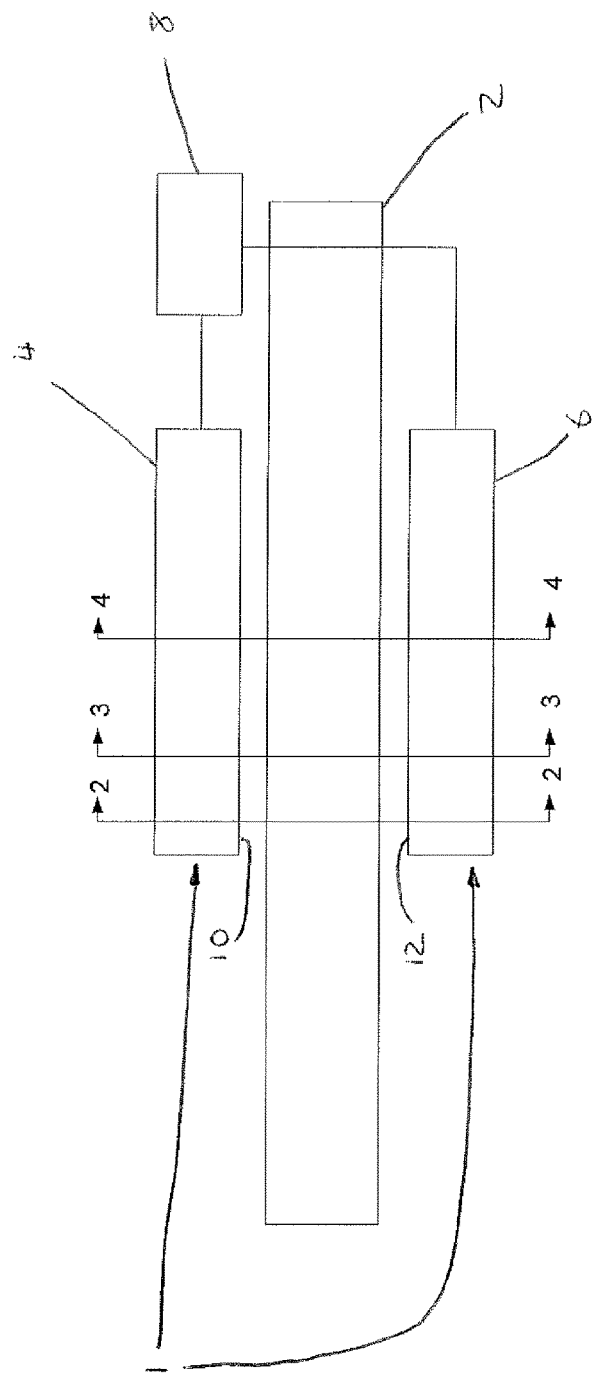
Figure 1
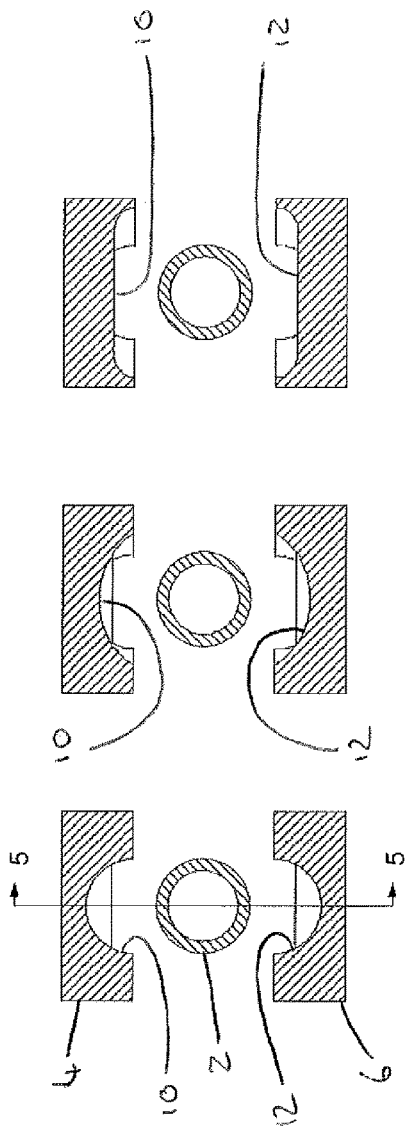
Figure 2
Figure 3
Figure 4

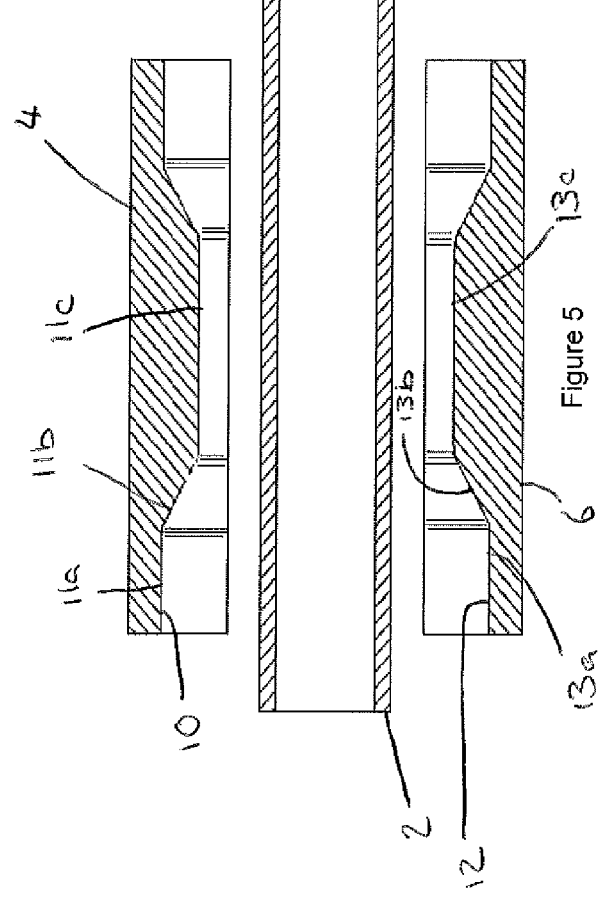
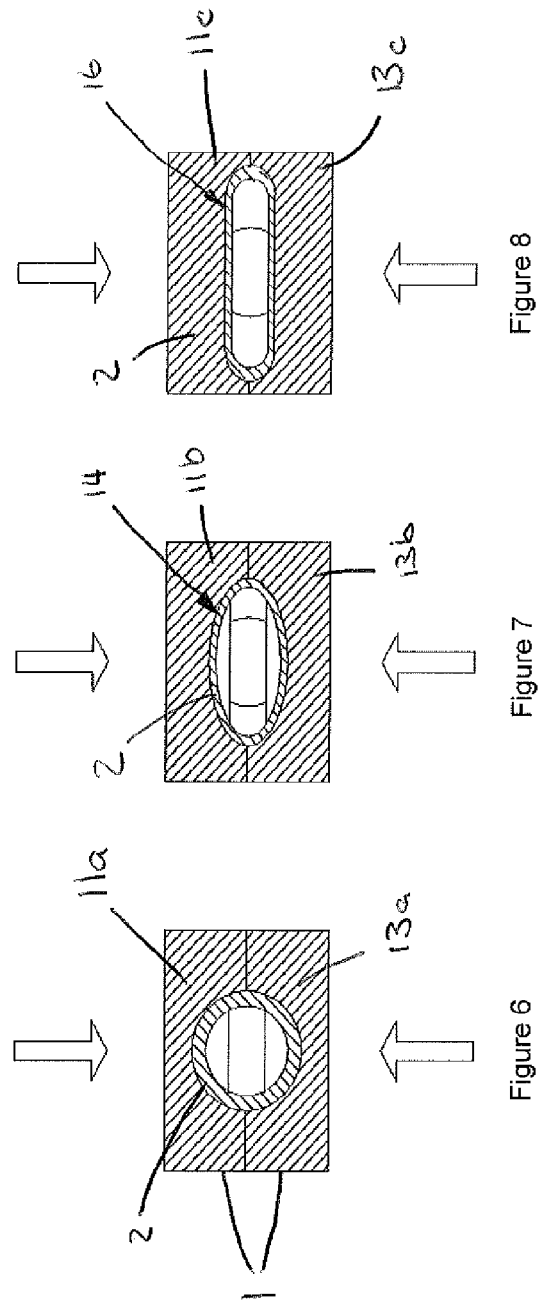

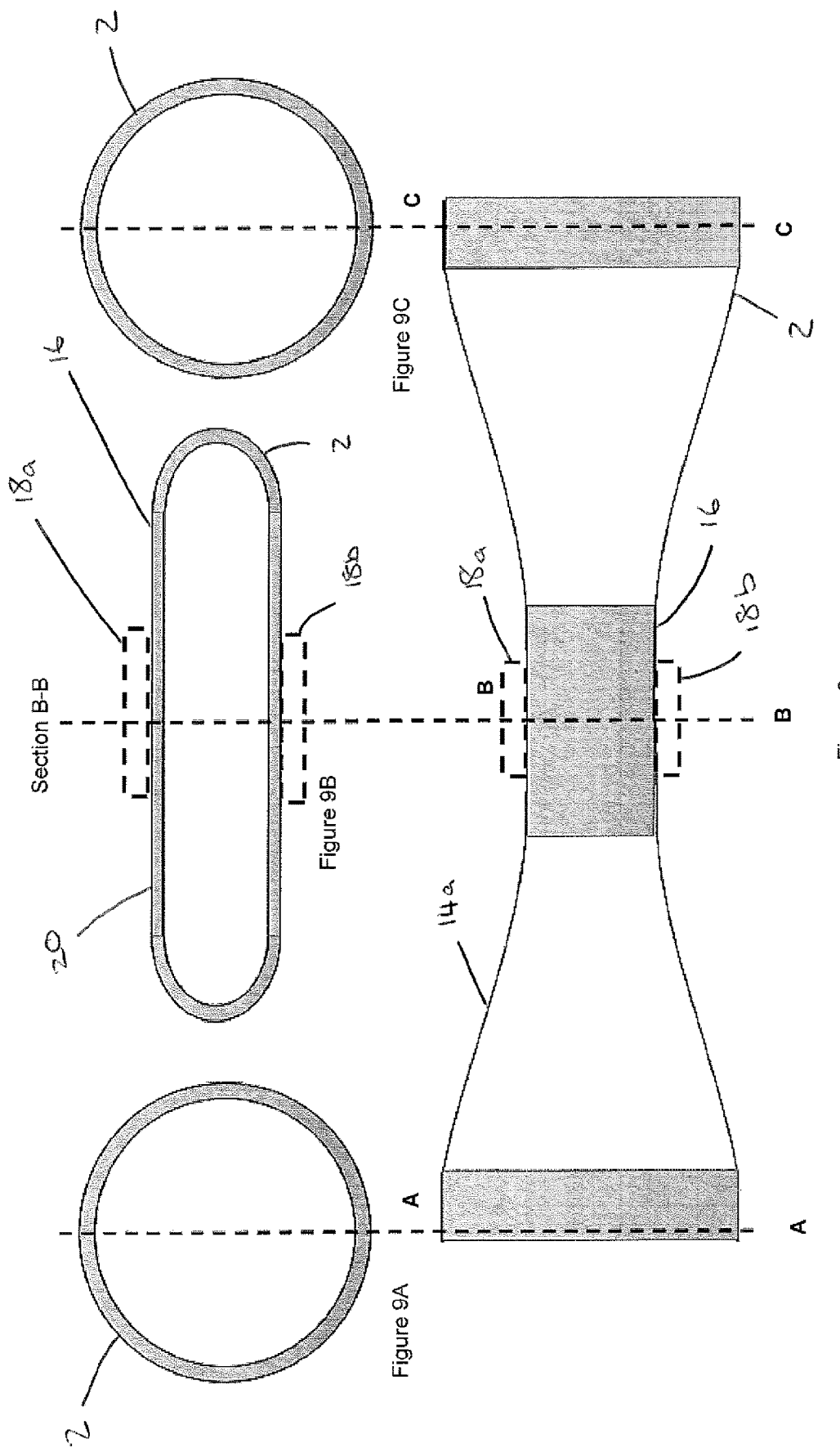

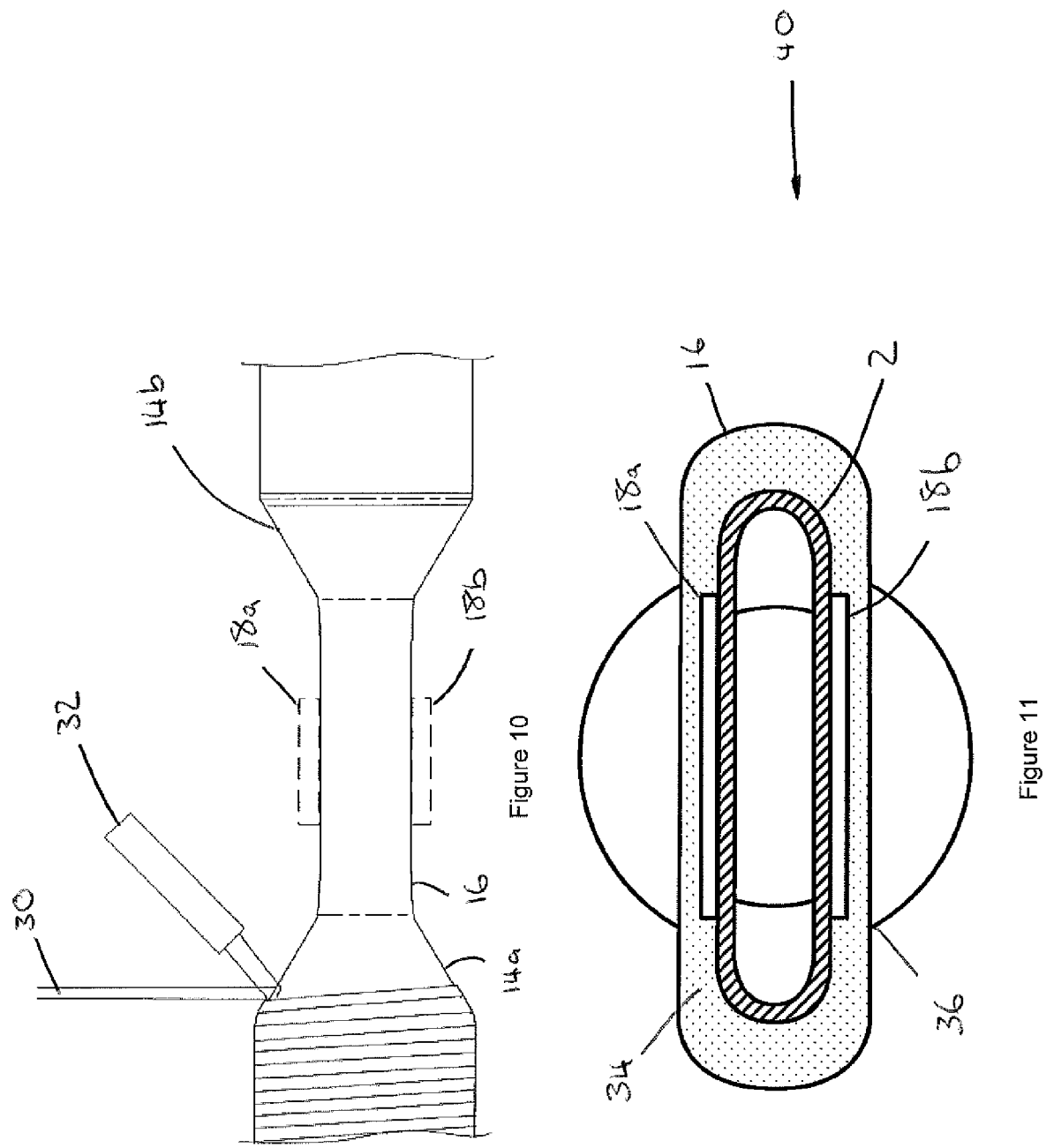

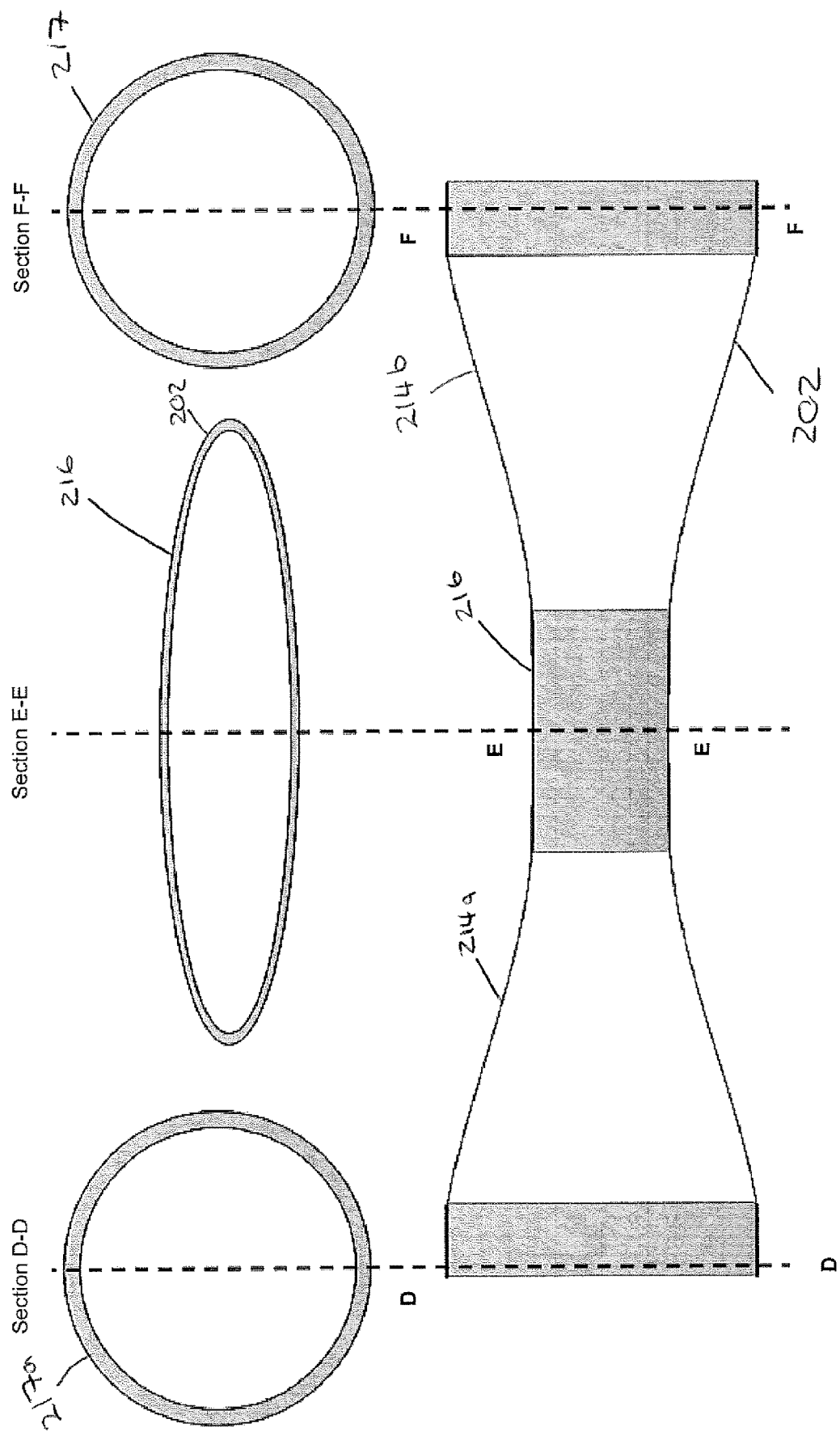

PIPE FORMING METHOD

FIELD

Some described examples relate to a method for forming composite pipes, particularly to a method for forming fluid conduits such as fluid conduits which may be required to take a specific form, or comprise a specific geometric feature, for example.

BACKGROUND

In recent years, advancements in the field of composite materials have resulted in their use in fluid conduit structures, for example in the development of pipelines in the oil and gas industry. Composite fluid conduits may be constructed such that, for a given application, they have superior qualities in comparison to, for example, a steel conduit. This may be, for instance, due to an improved strength to weight ratio. The availability of a large variety of composite materials and construction methods allows composite fluid conduits to be tailored according to their specific application. Like in most fluid conduit structures, consideration must be given to connecting composite fluid conduits to other structures.

SUMMARY

It should be understood that one or more features of one of the following aspects may apply alone or in any combination in relation to any of the other aspects.

An aspect of the present invention relates to a method for forming a composite fluid conduit, comprising:
  providing an inner pipe having a variation in cross-section between at least two different longitudinal sections thereof; and
  applying a fibre reinforced composite material to the inner pipe.

In use, the method may be used to form a composite fluid conduit which does not have the same cross sectional form along its length. For example, a portion in the mid-section or at an end region of the composite fluid conduit may comprise a different cross sectional form than a different section of the fluid conduit. This may permit the fluid conduit to be better suited to its intended application.

The method may allow the composite fluid conduit to be constructed with a desired geometric form and strength. The method may allow the composite fluid conduit to withstand operational stresses. Operational stresses may include internal stresses, for example, as a result of a pressure exerted by a fluid within the fluid conduit. Operational stresses may include external stresses which act on the composite fluid conduit as a result of, for example, interaction with other structures, from hydrostatic pressure, or the like.

The variation in cross section between at least two longitudinal sections of the inner pipe may include a variation in cross sectional area. Such a variation in cross sectional area may be achieved with a uniform cross sectional shape. Such a variation in cross sectional area may be achieved with a corresponding variation in cross sectional shape.

The variation in cross section between at least two longitudinal sections of the inner pipe may include a variation in cross sectional shape. Such a variation in cross sectional shape may be achieved with a uniform cross sectional area. Such a variation in cross sectional shape may be achieved with a corresponding variation in cross sectional area.

In some embodiments the variation in cross section may be provided to achieve a particular flow profile of fluid through the inner pipe. For example, a variation in cross sectional area may provide a venturi effect or the like, such as might be used in flow measurement.

The variation in cross section, such as a variation in cross sectional shape may be provided to accommodate associated devices, components, equipment or the like, such as sensors, connectors or the like. A variation in cross section, such as a variation in cross sectional shape, may be provided to facilitate improved measurement associated with the pipe and/or with fluid or other matter transported through the pipe The method may comprise forming the inner pipe to have a variation in cross-section between at least two different longitudinal sections thereof. In some embodiments the inner pipe may be manufactured to include the variation in cross section. For example, the inner pipe may be initially provided or formed with the variation in cross section. In some embodiments the inner pipe may be manufactured by a moulding process, such as by extrusion moulding, injection moulding or the like, wherein the variation in cross section is provided directly by the moulding process.

The method may comprise providing the inner pipe in a first form and then reforming the inner pipe to create a reformed pipe section having a desired shape. The reformed pipe section may provide the variation in cross-section between at least two longitudinal sections of the inner pipe. The inner pipe may be initially formed by, for example, any conventional manner such as extrusion moulding, injection moulding or the like.

The method may comprise providing the inner pipe with a uniform cross section along its length, and subsequently reforming at least a portion of the inner pipe to provide the variation in cross section.

In some embodiments the inner pipe may initially define a circular cross section. In some embodiments the inner pipe may initially define a non-circular cross-section, such as an oval cross section, elliptical cross section, square cross section or the like.

The method may comprise initially providing the inner pipe to have a variation in cross section between at least two longitudinal sections, and then reforming the inner pipe to provide an alternative or further variation.

The method may comprise forming or reforming the inner pipe by a process such as thermoforming. The method may comprise forming or reforming the inner pipe through use of a mould arrangement to achieve a variation in cross section of the inner pipe. The mould arrangement may comprise any object or surface which may be pressed against a surface of the inner pipe to produce a change in the form of the inner pipe. A moulding process may refer to any process which involves shaping, for example reshaping the inner pipe.

The inner pipe may be made from any suitable material, for example from a polymer such as a thermoplastic. The material of the inner pipe may be or comprise, for example, polyether ether ketone (PEEK), polyaryl ether ketone (PAEK), polyvinyl chloride (PVC), polyvinylidene difluoride (PVDF), polyphenylene sulphide (PPS) or the like. The inner pipe may include one or more reinforcing fibres. In some embodiments the inner pipe may be completely devoid of any reinforcing fibres.

Any appropriate method may be used to form or reform the inner pipe material. The method may comprise forming or reforming the inner pipe using heat. The method may comprise applying heat to the inner pipe material through either direct contact with a heated surface, for example a heated die, and/or through contact with a heat source, for example a flame, source of heated air or the like. The method may comprise applying heat to at least one of an inner surface and an outer surface of the inner pipe. The method may comprise measuring the temperature of the inner pipe during a forming or reforming process. The method may comprise heating the inner pipe to a specific temperature or temperature range. The temperature or temperature range may be, for example, between the glass transition temperature and melting point of the inner pipe material.

The method may comprise applying heat to the inner pipe over a period of time. The method may comprise applying heat over a period of time to allow the heat to sufficiently penetrate the material of the inner pipe.

The method may comprise heating the inner pipe and holding the inner pipe at a predefined temperature. The method may comprise heating the inner pipe to a first predetermined temperature and holding the inner pipe at this first predetermined temperature for a first period of time. The method may comprise subsequently heating or cooling the inner pipe to a second predetermined temperature. The method may comprise holding the inner pipe at this second predetermined temperature for a second period of time. The method may comprise heating/cooling the inner pipe to subsequent predetermined temperatures, and optionally holding the inner pipe at these predetermined temperatures for respective periods of time. The method may comprise selecting the predetermined temperature(s) based on the properties of the inner pipe. The method may comprise selecting the predetermined temperature(s) such that the material of the inner pipe softens and may be moulded or reformed.

The method may comprise controlling the rate of heating of the pipe. The method may comprise gradually heating the inner pipe. The method may comprise changing the rate of heating of the inner pipe as the inner pipe is heated.

The method may comprise mechanically forming or reforming the inner pipe. The method may comprise mechanically forming or reforming the inner surface of the inner pipe. The method may comprise mechanically forming or reforming the outer surface of the inner pipe.

The method may comprise machining the inner pipe. The method may comprise removing material from the inner pipe. The inner pipe may initially have a thick wall section, which may be made thinner when reformed, for example by machining.

The method may comprise applying a pressure to a surface of the inner pipe. The method may comprise applying pressure so as to plastically deform the inner pipe. The method may comprise prolonging the application of pressure. The prolonged application of pressure may have the effect of gradual plastic deformation of the inner pipe material.

The method may comprise heating the inner pipe so as to facilitate or assist plastic deformation of the inner pipe material. The method may comprise using residual heat within the inner pipe from a previous process, such as an initial manufacturing process, treating process or the like. The method may comprise using a dedicated heating process.

The method may comprise applying pressure via a physical mould apparatus or the like. The method may comprise applying pressure via a fluid, for example via an internal inflation fluid pressure, internal vacuum, external collapse pressure or the like.

The method may comprise forming or reforming the inner pipe by a combination of different methods. The method may comprise forming or reforming the inner pipe by a combination of, for example, both heating and mechanical means.

Forming or reforming the inner pipe may comprise initially heating the inner pipe and then using a mechanical method such as moulding, blow moulding, stretching, compression or the like.

Forming or reforming the inner pipe may comprise using a forming apparatus, for example a heated mould. The method may comprise heating the forming apparatus by any appropriate means, for example by an external heat source such as a flame, heated air or the like. The method may comprise heating the forming apparatus with an internal heating mechanism such as using one or more heating elements, for example a resistive heating element or the like. The method may comprise placing the forming apparatus in contact with a section of the inner pipe. The method may comprise using the forming apparatus to apply heat and/or pressure to a section of the inner pipe so as to form or reform the section of the inner pipe.

The method may comprise controlling a rate of deformation of the inner pipe. For example, the method may comprise controlling a rate of relative movement between the inner pipe and a forming apparatus. The method may comprise using an actuator to provide relative displacement between the inner pipe and the forming apparatus and/or apply pressure to the inner pipe. The method may comprise controlling the actuator so as to control the rate of relative displacement of the inner pipe and the forming apparatus or the rate of application of pressure from the forming apparatus to the inner pipe.

The method may comprise controlling a rate of application of pressure to the inner pipe. For example, the method may comprise controlling a rate of application of pressure to the inner pipe so as to avoid damage to the inner pipe.

The method may comprise altering the material characteristics of the inner pipe. In some embodiments altering the material characteristics of the inner pipe may be achieved without or with minimal change in the shape of the inner pipe. The method may comprise altering the material characteristics of the inner pipe by tempering the inner pipe. The method may comprise holding the material of the inner pipe in a particular state over a period of time, for example a predetermined period of time. The method may comprise holding the material of the inner pipe at a predetermined pressure and/or a predetermined temperature for a period of time. The method may comprise holding the material of the inner pipe at an elevated pressure and/or at an elevated temperature for a predetermined period of time. Holding the material of the inner pipe in a particular state may have the effect of changing the crystal structure of the polymer, and/or reducing internal stresses in the inner pipe material.

The specific temperature at which the inner pipe may be held, without substantial reformation, may be a relaxation temperature. The relaxation temperature may be lower than the temperature applied to the inner pipe during forming or reforming. The method may comprise selecting the predetermined period of time so as to allow internal stresses within the material of the inner pipe to be dissipated.

The method may comprise holding the inner pipe at a temperature and pressure for a predetermined period of time in a manufacturing apparatus, such as in a forming apparatus, and then disengaging the manufacturing apparatus from the inner pipe. The method may comprise allowing the inner pipe to cool to ambient temperature. The method may comprise cooling the inner pipe to ambient temperature naturally. The method may comprise cooling the inner pipe to ambient temperature via a forced cooling method, for example through use of a fan.

The method may comprise forming or reforming the inner pipe and then altering the material characteristics of the inner pipe. The steps of forming or reforming the inner pipe and altering the material characteristics of the inner pipe may be performed sequentially or may at least partially overlap. The method may comprise forming or reforming the inner pipe, waiting a predetermined period of time, and then altering the material characteristics of the inner pipe. The method may comprise forming or reforming the material of the inner pipe using a device, for example a mould, and maintaining the reformed material of the inner pipe in engagement with the device once reforming is complete. The method may comprise maintaining the reformed material of the inner pipe in engagement with the device for a predetermined period. The period may be longer than the time that has been taken to initially reform the inner pipe material. The method may comprise maintaining the reformed material of the inner pipe in engagement with the device at an elevated temperature and/or pressure.

The method may comprise forming or reforming the inner pipe in one or more sections. The method may comprise retaining at least one section of inner pipe with its original geometry. The cross sectional profile of sections of the inner pipe which are on either side of a formed or reformed section of the inner pipe may be similar or substantially similar. The cross sectional form of the sections of inner pipe which have not been formed or reformed may be circular or substantially circular.

The method may comprise forming a section of inner pipe from several smaller sections. The method may comprise connecting the sections of inner pipe together by any appropriate method, for example melding, chemically bonding or the like.

The method may comprise forming a section of inner pipe from several reformed sections of inner pipe. The method may comprise forming a section of inner pipe from at least one reformed section of inner pipe, and at least one section of inner pipe which has not been reformed. The reformed sections of inner pipe may be of similar or varying lengths. The reformed sections of inner pipe may be of the same or varying cross sectional dimensions. Any sections of inner pipe which have not been reformed may be of similar or varying lengths. Any sections of inner pipe which have not been reformed may be of the same or varying cross sectional dimensions. The method may comprise connecting the sections of inner pipe together by any appropriate method, for example melding and/or chemically bonding.

The inner pipe, and thus fluid conduit, may be intended to contain a fluid flow. The method may comprise varying the cross section of the inner pipe in order to achieve a varying flow profile of fluid as it flows through the composite fluid composite. Differing flow profiles may provide multiple advantages and/or uses, for example the ability to provide a region of alternative characteristics of fluid flow, a region which is preferential for sensor placement and/or operation, and the like. A formed or reformed section of the inner pipe may allow for a region to be configured to measure flow characteristics associated with the conduit.

The inner pipe, and thus fluid conduit, may be intended to contain media other than fluid flow, for example cables, tools or the like. The method may comprise varying the cross section of the inner pipe in order to achieve differing cross sectional forms of inner pipe. A differing cross sectional form may facilitate the passage of a type of media through the inner pipe.

The inner pipe, and thus fluid conduit, may be configured to receive, support or contain an apparatus therein, such as a flow control apparatus, for example a valve or the like. The varying cross section of the inner pipe may assist to accommodate the apparatus within the inner pipe, for example by creating a supporting region, mounting profile or the like. The method may comprise installing apparatus within the inner pipe.

The method may comprise forming or reforming a section of the inner pipe such that said formed or reformed section has a different cross sectional area compared to an adjacent section. The formed or reformed section of the inner pipe may have a reduced or increased cross sectional area compared to an adjacent section. The cross sectional shape of the formed or reformed section may be geometrically similar or substantially geometrically similar to the cross sectional shape of an adjacent section. A smaller/larger cross sectional area may permit the formed or reformed section of the pipe to be used as, for example, a venturi which may have applications such as in flow metering or the like.

The method may comprise forming or reforming a section of the inner pipe to have a similar or substantially similar cross sectional area compared to an adjacent section, for example an adjacent section which has not been reformed. The cross sectional shape of the formed or reformed section may be geometrically dissimilar to the cross sectional shape of an adjacent section. The formed or reformed sectional shape may be oval, oblong, polygonal, irregular or a combination of these shapes. The formed or reformed section of the inner pipe may assist to provide improved placement and/or operation of electronic devices external to the inner pipe wall.

The method may comprise providing a variation in cross section, for example by reforming, of the inner pipe that is intermediate to the ends of the pipe.

The method may comprise providing a variation in cross sectional shape, for example by forming or reforming, along the inner pipe such that a section of inner pipe may allow improved placement and/or operation of a device, such as an electronic device, while maintaining the same cross sectional area as a different shaped section of the inner pipe. The varied cross sectional shape may allow improved placement and/or operation of a device while minimising flow restrictions through the inner pipe.

The device or devices may comprise, for example, a transducer, transmitter, receiver, transceiver, antenna, cavity member, such as a resonant cavity member, strain sensor, pressure sensor or the like. In some embodiments the device may comprise, for example, a strain measurement device such as an electrical strain gauge, a Wheatstone bridge, a fibre optic strain gauge or the like. Strain measurement may be utilised to provide or permit pressure internally and/or externally of the fluid conduit to be determined. In some embodiments the material of the fluid conduit, at least in the region of a strain measurement device, may encourage or exaggerate strain to assist to improve strain measurement.

More generally, the material of the fluid conduit may be provided to assist to improve the capability and/or sensitivity of any measurement and/or sensor device.

Improved placement and/or operation of a device may mean that a larger percentage of the volume of the inner pipe is able to be monitored and/or measured. Improved placement and/or operation of a device may mean that a clearer signal may be able to be transmitted to and/or received from a device.

The method may comprise providing a variation in cross sectional shape, for example by forming or reforming, along the inner pipe to define an attachment surface which may facilitate the attachment of a device to the inner pipe. The inner pipe, for example a reformed section, may comprise a flat or substantially flat attachment surface, or more than one flat or substantially flat attachment surface. The inner pipe, for example a reformed section, may comprise one or more curved attachment surfaces. The inner pipe, for example a reformed section, may comprise an attachment surface defining one or more geometric features. Each geometric feature may accommodate and/or facilitate the attachment of a device such as a sensor and/or a transmitter to the inner pipe. The attachment surface or attachment surfaces may be arranged to allow a device or devices to be preferentially positioned. For example, the attachment surface or attachment surfaces may be arranged to allow the device or devices to be placed more closely together. This may allow the preferential placement of a sensor and a transmitter for improved signal transmission. For example, the attachment surface or attachment surfaces may be arranged to provide a shorter transmission path between the sensor and the transmitter.

The method may comprise providing a variation in cross section, for example by forming or reforming, along the inner pipe such that the distance between opposing wall regions of the inner pipe at a longitudinal section is reduced. Such an arrangement may facilitate improved measurement or sensing capabilities. For example, the reduced distance between opposing wall regions may permit a signal, such as an electromagnetic signal, acoustic signal or the like, to travel along a shorter transmission path between the opposing wall regions. Such a shorter transmission path may reduce or minimise attention, energy loss and the like in the signal.

The signal may be utilised to provide for measurement or sensing of a fluid flowing through the composite pipe, such as sensing pressure, temperature, composition or the like. The signal may be used to alter a property of the fluid, such as a temperature or the like.

In some embodiments the opposing wall regions may accommodate, for example support or be associated with, respective transmission and receiving devices for transmitting and receiving a signal.

In some embodiments the longitudinal section may be formed to have opposing wall regions which are closer together without or with minimal change in cross-sectional area at the longitudinal section. Such an arrangement may assist to minimise the effects on the properties, for example velocity, pressure and the like, of the fluid during travel through the longitudinal section. This arrangement may assist to ensure any measurements at the longitudinal section may be assumed to reflect a more global condition of the flowing fluid along the conduit.

The longitudinal section may be formed or reformed by laterally compressing or flattening a portion of an initially round or substantially round inner pipe.

In one embodiment the method may comprise providing a variation in cross section, for example by forming or reforming, along the inner pipe such that opposing wall regions of the inner pipe at a first longitudinal section are positioned closer together than opposing wall regions of a different second longitudinal section.

The method may comprise providing a variation in cross section, for example by forming or reforming a section of the inner pipe, to provide an attachment surface which allows the attachment of a larger device, for example than may be possible with a conventional, for example round, pipe form. The variation in cross section of the inner pipe may comprise or provide an attachment surface which allows the attachment of multiple devices per surface. A larger device may permit a larger percentage of the volume of the media of the inner pipe to be monitored. For example, the device may be of the same width as the attachment surface. Multiple devices may be attached such that the multiple devices collectively span the entire width of the attachment surface. Multiple devices per attachment surface may permit more aspects of the media within the inner pipe to be monitored.

A device may be attached to more than one surface. For example, a device may be configured to cover and/or be attached to all outer or all inner surfaces of the inner pipe. For example, the device may cover and/or be attached around the entire perimeter of the inner pipe.

In one embodiment a formed or reformed section of the inner pipe may comprise a similar or substantially similar cross sectional area across its length, while comprising a differing cross sectional shape. A formed or reformed section of the inner pipe may comprise a similar or substantially similar cross sectional shape across its length, while comprising a differing cross sectional area across its length. A formed or reformed section of the inner pipe may comprise both a differing cross sectional area and a differing cross sectional shape along its length.

The method may comprise providing a variation in cross section, for example by reforming, at an end region of the inner pipe. The end region of the pipe may be provided to comprise a flared region. The flared region may increase the outer diameter at the end of the inner pipe. Alternatively, the reformed end region of the inner pipe may comprise a narrowed region. The narrowed region may decrease the outer diameter at the end of the inner pipe. The end region of the inner pipe comprising a variation in cross section may facilitate a connection to a secondary device. The end region of the inner pipe comprising a variation in cross section may provide or define an engaging or sealing surface to an external device. For example, the end region may be able to be coupled to a flange. The end region may comprise a groove or gap in which a seal may be placed. The seal may help to prevent fluid leakage in the event of attachment to an external device or conduit. The end region of pipe may assist to permit coupling to external devices or conduits which do not have the same outer diameter as the inner pipe.

The method may comprise forming or providing a transitional section between adjacent longitudinal sections of the inner pipe having a varying cross section therebetween. The form of the transitional section may preferentially affect characteristics of a fluid flow along the inner pipe. At the transitional section, the rate of transition may be gradual. A gradual transition may assist to minimise frictional flow losses in the pipe. A gradual transition may minimise factors such as stress concentrations in the inner pipe. Stress concentrations may be an important consideration when the inner pipe is under loading. The inner pipe may comprise multiple transitional sections. The rate of transition of at least two transitional sections may be similar or substantially similar. In some embodiment the rate of transition of at least two transitional sections may have a different rate of transition.

The method may comprise forming or reforming the inner pipe prior to applying any fibre reinforced composite material.

In some embodiments the method may comprise applying a fibre reinforced composite material to the inner pipe, and then reforming at least a portion of the inner pipe. Applying the fibre reinforced composite material prior to reforming the inner pipe may assist in providing a degree of support to the inner pipe during the reforming process. The method may comprise applying further fibre reinforced composite material to the inner pipe following a reforming step.

The fibre reinforced composite material may comprise at least a matrix material and one or more reinforcing fibres embedded within the matrix material.

The reinforcing fibres may made from or comprise any suitable material. The reinforcing fibres may be made from, for example, carbon fibre, glass fibre or the like.

The matrix material may be made from or comprise any suitable material, for example from a polymer such as a thermoplastic. The matrix material may be or comprise, for example, polyether ether ketone (PEEK), polyaryl ether ketone (PAEK), polyvinyl chloride (PVC), polyvinylidene diflouride (PVDF), polyphenylene sulphide (PPS) or the like.

The method may comprise bonding the fibre reinforced composite material to the inner pipe. Bonding the fibre reinforced composite material to the inner pipe may prevent movement of the inner pipe relative to the fibre reinforced composite material. The method may comprise bonding the fibre reinforced composite material to the inner pipe by way of melding and/or fusing. This arrangement may create a monolithic structure, extending substantially continuously between the inner pipe and the composite material.

The method may comprise using a material of inner pipe which is the same as a matrix material of the fibre reinforced composite material. Having a matrix material bonded, fused, melded or the like to the inner pipe of the same material may ensure a stronger bond. Such bonding may define or create a monolithic matrix structure extending continuously from the inner pipe and through to the composite material.

The monolithic structure may comprise a single matrix material with embedded reinforcing fibres.

The method may comprise applying the fibre reinforced composite material to a surface of the inner pipe. The method may comprise applying the fibre reinforced composite material to the surface of the inner pipe by any appropriate method. The method may comprise applying the fibre reinforced composite material to the surface of the inner pipe by direct application of the fibre reinforced composite material, for example by spreading, winding, layering, wrapping, weaving, over-moulding or the like around the inner pipe.

The method may comprise preparing or having prepared the fibre reinforced composite material before application. The method may comprise preparing or having prepared the fibre reinforced composite material such that it comprises a particular form.

The method may comprise preparing or having prepared the fibre reinforced composite material to be in a mouldable or malleable form. The method may comprise applying the fibre reinforced composite material to the surface of the inner pipe by, for example, over-moulding.

The method may comprise preparing or providing the fibre reinforced composite material such that it is in the form of a tape of fibre reinforced composite material. The tape of fibre reinforced composite material may comprise reinforcing fibres integrated, for example pre-impregnated within a matrix material. The tape of fibre reinforced composite material may comprise continuous reinforcing fibres integrated within a matrix material. The method may comprise applying a fibre reinforced composite material to the inner pipe which is in the form of a tape.

The method may comprise wrapping the fibre reinforced composite material, for example provided in the form of a tape, around the inner pipe. One or more layers of fibre reinforced composite material may be applied to the inner pipe.

The method may comprise applying the fibre reinforced composite material through winding a source of the fibre reinforced composite material around a static inner pipe. Alternatively, the method may comprise maintaining the source of reinforced composite material in a static position, while moving the inner pipe, for example by rotational and/or translational movement.

The method may comprise attaching fibre reinforced composite material to the inner pipe. Attachment of the fibre reinforced composite material may be by bonding or fusing. The method may comprise bonding or fusing the fibre reinforced composite material chemically (e.g. by application of a resin), and/or by application of heat. The application of heat may cause localised melting of the inner pipe and/or reinforcing material. The localised melting of the inner pipe may bond or fuse the reinforcing material with the inner pipe. The bonding or fusing may assist to ensure that there is minimal movement of the inner pipe relative to the reinforcing material when the fluid conduit is under loading.

The method may comprise applying the fibre reinforced composite material to the inner pipe, and applying a process to the fibre reinforced composite material. The process may enhance the bonding of the fibre reinforced composite material to the inner pipe. The process may involve the further application of heat. The process may comprise applying the heat in the form of, for example, a source of heated air, a laser and/or direct contact with a heated object such as a heated roller. The process may comprise application of pressure. The process may comprise applying pressure through direct contact with a device such as a mould, a roller, or the like.

The fibre reinforced composite material may provide the inner pipe with enhanced properties, such as enhanced toughness, strength and/or tenacity.

The method may comprise attaching a device to the fibre reinforced composite material. The method may comprise attaching a device to the outer surface of the fibre reinforced composite material. The method may comprise attaching the device after the application of some or all of the fibre reinforced composite material. The method may comprise bonding the device to the fibre reinforced composite material. The method may comprise bonding the device by any appropriate means, for example by use of glue, resin or the like.

The method may comprise embedding a device in the fibre reinforced composite material. The method may comprise embedding the device at any point or points along the length of the fluid conduit. The method may comprise installing the device before the application of the fibre reinforced composite material. In this instance there may be no fibre reinforced composite material between the device and the inner pipe. As such, one surface of the device may be in direct contact with a wall of the inner pipe. The method may comprise installing the device after the application of some or all of the fibre reinforced composite material. In this case, at least one surface of the device may be in contact with the fibre reinforced composite material. The method may comprise holding the device in place by the fibre reinforced composite material. The method may comprise bonding the device to the surface of the inner pipe. Methods comprising embedding and/or bonding the device may be used to limit unwanted movement of the device when in operation. Embedding a device in the fluid conduit may prevent the device from causing an obstruction when the fluid conduit is in use (e.g. an obstruction to a fluid flow).

The device may be or comprise, for example, at least one of a receiver, a sensor and a transmitter. The device may be able to measure the composition of a fluid flow. The device may be able to measure characteristics of a fluid or fluid flow. The device may be able to measure aspects such as the viscosity of a fluid, a flow rate of a fluid and/or detect if the fluid contains any particulates. The device may function to transmit a signal into a fluid flow. The signal may be, for example, an acoustic signal, an electromagnetic signal or the like. The device or combination of devices may enable a section of the conduit to be used as a measurement apparatus. The device or combination of devices may enable a section of the conduit to be used as a venturi meter. In this case, the device may be or comprise a strain gauge for determining pressure from strain in the conduit, a static pressure port and/or the like.

The device may be or comprise a cavity member. The cavity member may at least partially confine a signal transmitted within the cavity member. This arrangement may improve the sensitivity of the measurement apparatus. The cavity member may function to support resonance of a signal transmitted within the cavity member.

The method may comprise an uneven application of the fibre reinforced composite material across the entire cross section of the fluid conduit. The distribution of reinforcing fibres may be denser towards the outer surface of the composite fluid conduit. The inner surface of the inner pipe may not contain any reinforcing fibres. Reinforcing fibres within the fibre reinforced composite material may cause a signal emitted by an embedded device to scatter or attenuate. Therefore, a lack of reinforcing fibres towards the inner surface may allow better functioning of an embedded device. The device may function as a sensor. Better functioning of the device may be as a result of a decreased attenuation of, for example, electromagnetic or acoustic signals. Better functioning of the device may enable, for example, a better strain measurement which may be used for measurement of pressure and/or external mechanical load and/or temperature acting on or of the fluid conduit.

The distribution of reinforcing fibre density may be such that there are no fibres in contact with the inner surface of the fluid conduit. In the case that there is an imperfect bond between the composite matrix material and a reinforcing fibre, there may be a likelihood of a leak path forming between a reinforcing fibre and a section of the composite matrix material. A lack of fibres in contact with the inner surface of the fluid conduit may result in a seal between an inner surface of the fluid conduit and any such leak paths.

The method may allow the volume of fibre reinforced composite material applied to the inner pipe to be selected before application. The method may permit an even volume or density of fibre reinforced composite material to be applied along the length of the inner pipe. The method may allow a change in the volume or density of reinforced composite material applied to one section or portion.

The method may comprise varying the application of the reinforced composite material along the length of the inner pipe. Varying the application of the reinforced composite material along the length of the fluid conduit may permit an element of control over the outer dimensions of the fluid conduit. For example, the application of more reinforced composite material over a section of inner pipe may result in an increased outer dimension at that section. A varied application of the reinforced composite material may permit a length of fluid conduit, which comprises a length of inner pipe of varying dimensions, to have a constant outer dimension along the length of the fluid conduit. Alternatively, varied application of the reinforcing composite material may permit a length of fluid conduit, which comprises a length of inner pipe of constant or uniform dimension, to define a varying outer dimension.

A specific outer dimension of a length of fluid conduit may provide the length of fluid conduit with preferable characteristics. A fluid conduit may comprise a section which has a significantly larger outer dimension compared to the rest of the fluid conduit. A section of fluid conduit comprising a larger outer dimension may act as a centraliser for a fluid conduit which is being used in a well bore, for example. Alternatively, a fluid conduit which has a constant outer dimension may perform preferably under certain loadings to reduce the occurrence of internal stress concentrations.

Further forming methods may be applied to the reinforced composite material. The method may comprise removing material from the reinforced composite material. The removal of material may provide a surface of the fluid conduit with a geometric feature. The material may be removed by means of a machining method, for example milling, drilling, grinding or turning.

A geometric feature on the fluid conduit may facilitate the attachment of an external device. The external device may be a fastening device such as a collar. The external device may comprise a split structure, such as a split collar. A split structure may facilitate the installation of the fastening device onto the fluid conduit. Alternatively, the external device may be formed as one single unit. The method may comprise installing the external device on the fluid conduit before said conduit is fully constructed. Installation of the external device before the fluid conduit is fully constructed may facilitate a simpler installation. The geometric feature may also allow the installation of a compression arrangement to facilitate capability for the fluid conduit to be connected to other structures. The compression arrangement may assist to attach a section of the fluid conduit to another component. The method may comprise installing a seal member between an end of the fluid conduit and an external device. The compression arrangement may facilitate compression of the external device and fluid conduit. In this way, the fluid conduit may be able to sealingly communicate with an external device.

The method may comprise longitudinally or radially pre-compressing a section of the fluid conduit. Pre-compression may place a section of the fluid conduit in a normally compressed state. Placing a section of fluid conduit in a normally compressed state may permit the fluid conduit to experience neutral or lower stresses when tension is applied to the fluid conduit. The fluid conduit in the pre-compressed state may be able withstand a higher degree of longitudinal or radial tension before failure, compared to a fluid conduit which is not pre-compressed. The method may comprise applying the pre-compression by a particular application of the reinforcing composite material. For example, the reinforcing composite material in an outer portion of the fluid conduit may be applied in tension (e.g., hoop tension) so as to apply compression (e.g., hoop compression) to an inner portion of the fluid conduit. The method may comprise applying longitudinal pre-compression by compressing the fluid conduit between flange assemblies. For example, the method may comprise coupling a flange to either end of the fluid conduit. The method may comprise attaching flanges to either end of the fluid conduit through use of tie rods which may be tightened in order to apply a longitudinal compression to the fluid conduit.

An aspect of the present invention relates to a composite fluid conduit, comprising:
an inner pipe defining a variation in cross section between at least two longitudinal sections thereof; and
a reinforced composite material applied on the inner pipe.

The composite fluid conduit may be formed or manufactured by the method of any other aspect.

The fluid conduit may include one or more devices, such as an electrical device. At least one device may be embedded within a wall of the fluid conduit. At least one device may be embedded between the inner pipe and the composite material.

An aspect of the present invention relates to a method for forming a composite fluid conduit, comprising:
reforming an inner pipe to create a reformed pipe section having a desired shape; and
applying a fibre reinforced composite material to the reformed section of the inner pipe.

An aspect of the present invention relates to a composite fluid conduit, comprising:
an inner pipe having a reformed pipe section; and
a fibre reinforced composite material applied to the reformed section.

An aspect of the present invention relates to a method for forming a composite fluid conduit, comprising:
providing an inner pipe having a non-round cross-section along at least a portion of the length of the inner pipe; and
applying a fibre reinforced composite material to at least a portion of the inner pipe.

An aspect of the present invention relates to a composite fluid conduit, comprising:
an inner pipe having a non-round cross-section along at least a portion of the length of the inner pipe; and
a fibre reinforced composite material applied to at least a portion of the inner pipe.

An aspect of the present invention relates to a method for forming a composite fluid conduit, comprising:
providing an inner pipe having a surface on which to mount a device;
mounting a device upon the inner pipe; and
applying a fibre reinforced composite material to the inner pipe so as to embed the device.

An aspect of the present invention relates to a composite fluid conduit, comprising:
an inner pipe;
a device mounted on a mounting surface of the inner pipe; and
a fibre reinforced composite material applied to the inner pipe and embedding the device.

An aspect of the present invention relates to a method for forming a composite fluid conduit, comprising:
providing an inner pipe to include a variation in cross section at a location intermediate opposing axial ends of the inner pipe; and
applying a fibre reinforced composite material to the inner pipe at least at the location including the variation in cross section.

The method may include installing or mounting a device within a wall of the fluid conduit at the location including the variation in cross section.

An aspect of the present invention relates to a composite fluid conduit, comprising:
an inner pipe which includes a variation in cross section at a location intermediate opposing axial ends of the inner pipe; and
a reinforced composite material applied on the inner pipe at the location of the variation in cross section.

The fluid conduit may include a device at least partially embedded within a wall of the fluid conduit at the location including the variation in cross section.

An aspect of the present invention relates to a method for forming a composite fluid conduit, comprising:
providing an inner pipe to include a variation in cross section at one axial end region of the inner pipe; and
applying a fibre reinforced composite material to the inner pipe at the axial end region including the variation in cross section.

The method may include installing or mounting a device, such as a connector or fastening device, at the axial end region. Such an arrangement may facilitate connection of the fluid conduit to an external structure.

An aspect of the present invention relates to a composite fluid conduit, comprising:
an inner pipe which includes a variation in cross section at one axial end region of the inner pipe; and
a reinforced composite material applied on the inner pipe at the axial end region including the variation in cross section.

The fluid conduit may include a device, such as a connector or fastening device, the axial end region.

An aspect of the present invention relates to a method for forming a composite fluid conduit, comprising:
forming or reforming an inner pipe to have a variation in cross section such that the distance between opposing wall regions of the inner pipe at a longitudinal section is reduced; and
applying a fibre reinforced composite material to the inner pipe at the longitudinal section.

An aspect of the present invention relates to a composite fluid conduit, comprising:
an inner pipe have a variation in cross section such that the distance between opposing wall regions of the inner pipe at a longitudinal section is reduced; and
applying a fibre reinforced composite material to the inner pipe at the longitudinal section.

BRIEF DESCRIPTION OF DRAWINGS

These and other aspect of the present invention will now be described, by way of example only, with reference to the accompanying drawings, in which:

FIG. 1 is an elevation view of an inner pipe and a mould, according to one embodiment of the invention.

FIG. 2 is a cross sectional view of the inner pipe and mould along section 2-2 of FIG. 1, according to one embodiment of the invention.

FIG. 3 is a cross sectional view of the inner pipe and mould along section 3-3 of FIG. 1, according to one embodiment of the invention.

FIG. 4 is a cross section view of the inner pipe and mould along section 4-4 of FIG. 1, according to one embodiment of the invention.

FIG. 5 is a cross sectional view of the inner pipe and mould along section 5-5 of FIG. 2, according to one embodiment of the invention.

FIG. 6 is the cross sectional view shown in FIG. 2 with the inner pipe engaged in the mould, according to one embodiment of the invention.

FIG. 7 is the cross sectional view shown in FIG. 3 with the inner pipe engaged in the mould, according to one embodiment of the invention.

FIG. 8 is the cross sectional view shown in FIG. 4 with the inner pipe engaged in the mould, according to one embodiment of the invention.

FIG. 9 shows a moulded version of an inner pipe according to one embodiment of the invention, with FIGS. 9A, 9B and 9C showing cross sections along sections A-A, B-B and C-C respectively.

FIG. 10 is a moulded inner pipe with a device placed in the middle of the moulded section and with a composite material being applied to the surface of the inner pipe, according to one embodiment of the invention.

FIG. 11 is a cross sectional view along section A-A of FIG. 10.

FIG. 12 shows elevation and cross sectional views A-A, B-B and C-C of a moulded inner pipe according to one embodiment of the invention.

DETAILED DESCRIPTION OF DRAWINGS

Figure 13:
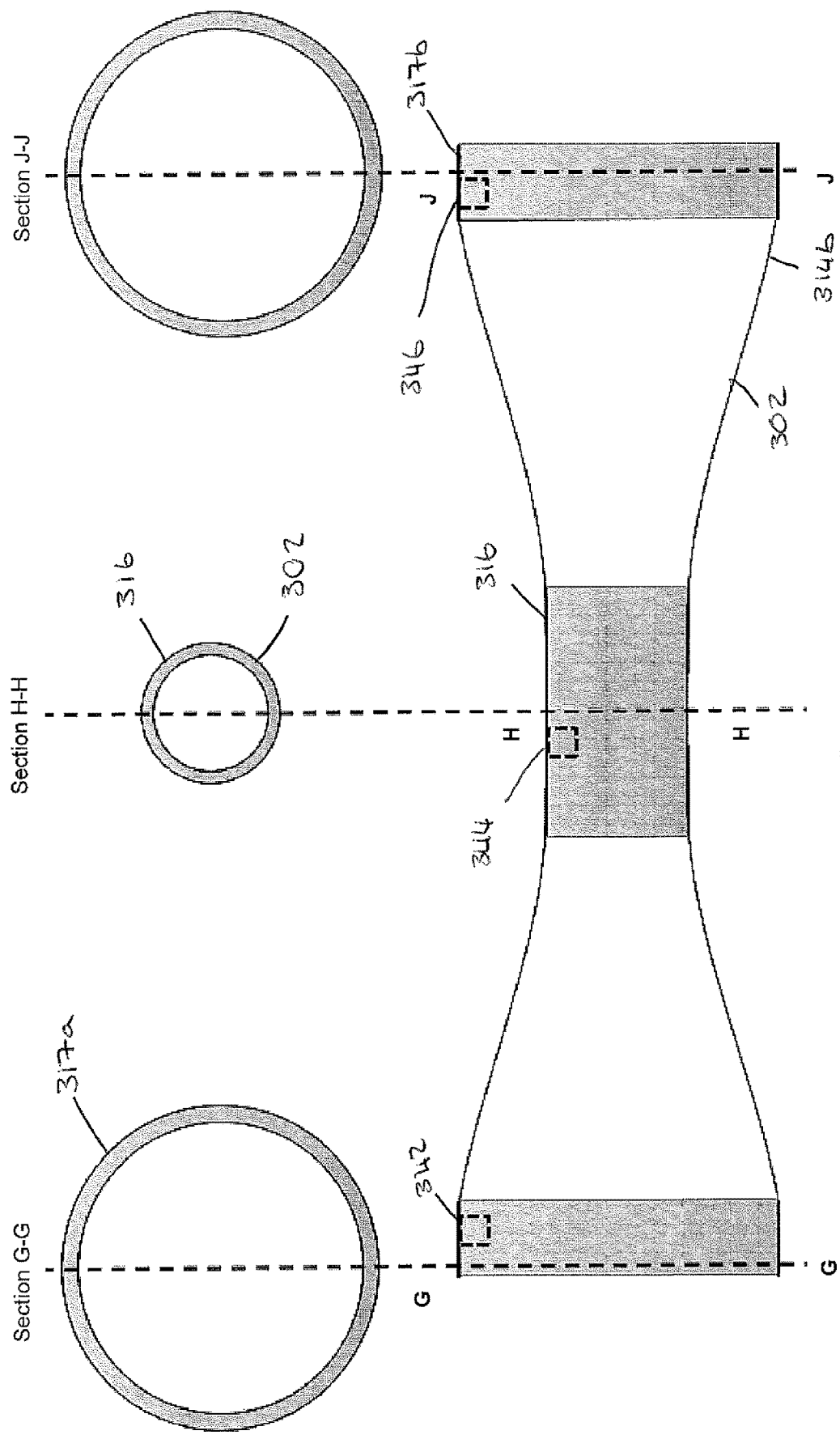
FIG. 13 shows elevation and cross sectional views A-A, B-B and C-C of a moulded inner pipe with attached sensors, according to one embodiment of the invention.

The method as described below generally relates to the reforming of a length of inner pipe, upon which a fibre reinforced composite material is laid. In some embodiments, before application of the fibre reinforced composite material, the inner pipe may be formed such that it has a particular shape. In some embodiments, before application of the fibre reinforced composite material, the inner pipe may be further reformed such that it has a particular shape. The inner pipe or a portion of the inner pipe may be directly formed in a desired shape, or may be formed and then reformed into a desired shape. The fibre reinforced composite material is, in some embodiments, then bonded to the inner pipe to create a composite fluid conduit with enhanced properties. Many different designs of fluid conduit are possible using the described method. Some of these designs, as well as some advantages of these designs, are described below.

FIG. 1 is an abstracted elevation of an external moulding device 1 for reforming a part of a pipe 2. As will be described in more detail below, the pipe 2 may form an inner part of a conduit and the pipe 2 is, therefore, herein referred to as an inner pipe. The external moulding device comprises a first mould portion 4 and a second mould portion 6. The external moulding device 1 is configured to engage a longitudinal section of the inner pipe 2 intermediate the ends of the inner pipe 2. As illustrated in FIG. 1, the inner pipe 2 is not yet engaged with the external moulding device 1. Consequently, the moulding surfaces 10, 12 of the external moulding device 1 are not in contact with the inner pipe 2. Both the first mould 4 and second mould 6 are in communication with a control device 8. The control device 8 may control aspects of the external moulding device 1 such as the pressure applied to the inner pipe 2, the period of time over which the external moulding device 1 is engaged with inner pipe 2, the rate of displacement of the external moulding device 1, and/or the temperature of the moulding surfaces 10, 12.

FIG. 2 is a cross sectional view of the external moulding device 1 and inner pipe 2 along section 2-2 as shown in FIG. 1. Along this section, first and second moulding surfaces 10, 12 are shaped such that, upon engagement with inner pipe 2, there will be minimal reformation of inner pipe 2. As in FIG. 1, the first and second moulds 4, 6 have yet to engage the inner pipe 2.

FIG. 3 is a cross sectional view of the external moulding device 1 and inner pipe 2 along section 3-3 as shown in FIG. 1. Along this section, moulding surfaces 10, 12 are shaped such that the inner pipe 2 will reform to the shape of the mould surfaces 10, 12 upon engagement of the first and second moulds 4, 6. In this embodiment, the section of inner pipe 2 along section 3-3 will deform to an oval shape. This shape represents a transitionally reformed section of inner pipe 2.

FIG. 4 is a cross sectional view of external moulding device 1 and inner pipe 2 along section 4-4 as shown in FIG. 2. Similar to FIG. 3, along this section moulding surfaces 10, 12 are shaped such that the inner pipe will reform to the shape of the mould surfaces 10, 12 upon engagement of the first and second moulds. In this embodiment, the section of pipe along section 4-4 will deform to an oblong shape. This section represents a fully reformed section of inner pipe 2.

FIG. 5 is a cross sectional view along section 5-5 of FIG. 2. Shown in more detail is a longitudinal profile of the moulding surfaces 10, 12 of the external moulding device 1. The moulding surfaces 10, 12 each comprise brace sections 11a, 13a, towards the ends of the moulding device 1, reformed sections 11c, 13c towards the centre of the moulding device 1, and transitional sections 11b, 13b intermediate the brace sections 11a, 13a, and the reformed sections 11c, 13c. The brace sections 11a, 13a of the mould are designed such that the adjacent surface of the inner pipe 2 which does not engage the moulding device 1 is minimally inadvertently reformed as a result of the moulding process. Transitional sections 11b, 13b provide a desired transition, for example gradual, from the brace sections 11a, 13a of the mould to the reformed sections 11c, 13c of the mould. Reformed sections 11c, 13c provide a desired shape to a reformed section of inner pipe 2.

FIGS. 6 to 8 are the same cross sectional views as shown in FIGS. 2 to 4, but with the external moulding device 1 and the inner pipe 2 in an engaged configuration. FIG. 6 shows the inner pipe 2 engaged in the brace section 11a, 13a of the moulding device, while FIG. 7 shows a transitionally reformed section 14 of inner pipe 2, and FIG. 8 shows a fully reformed section 16 of inner pipe 2.

FIGS. 2 to 8 illustrate the forming of a section of inner pipe in a very diagrammatical way. The external moulding device 1 is a transitional moulding device and forms an inverse of the desired shape to be moulded.

In use, before engagement with the external moulding device 1, the inner pipe 2 is preheated by an external device (not shown) which may be a heat source such as a flame or heated air. Heating of the inner pipe 2 is performed in a controlled manner. The inner pipe 2 is heated to a desired temperature, in this case a temperature between the glass transition temperature and melting temperature of the polymer from which it is formed. Heat is applied to the inner pipe 2 over a period of time, to allow the heat to fully penetrate the material of the inner pipe 2. The temperature is selected such that the material of the inner pipe 2 softens and can be easily moulded.

Referring again to the illustrated embodiment of the invention, the external moulding device 1 is placed in contact with the inner pipe 2. Pressure is applied to the surface between the external moulding device 1 and the inner pipe 2 such that reformation occurs. Pressure may, for example, be applied using an actuator (not shown). The actuator and, therefore, the rate of the displacement of the external moulding device 1 may be controlled so as to control the reformation rate of the inner pipe 2 and thereby avoid any damage to the inner pipe 2. For example, the rate of the displacement of the external moulding device 1 may be controlled so as to maintain the reformation rate of the inner pipe 2 below a maximum reformation rate.

The external moulding device 1 applies heat to the inner pipe 2 so as to maintain the inner pipe 2 at a relaxation temperature for a predetermined period of time. The external moulding device 1 may be heated for this purpose by any appropriate means, for example by an external heat source such as a flame or heated air, and/or the external moulding device 1 may comprise an internal heating mechanism such as a heating element. The external moulding device 1 maintains the inner pipe 2 at the relaxation temperature for a predetermined period of time without substantial reformation of the inner pipe 2. The relaxation temperature is lower than the temperature applied to the inner pipe 2 during reformation. Holding the inner pipe 2 at the relaxation temperature for a predetermined period of time allows at least some of the internal stresses within the material of the inner pipe 2 to be dissipated.

After holding the inner pipe 2 at a temperature and pressure for a period of time, the external device 1 is disengaged from the inner pipe 2. The inner pipe 2 is allowed to cool to ambient temperature. It is possible to leave the inner pipe 2 to cool to the ambient temperature naturally, or by forced cooling through use of, for example, a fan.

A profile of the reformed section of inner pipe 2 as shown in FIGS. 6 to 8 is illustrated in FIG. 9. Illustrated are the non-reformed sections of the inner pipe, as well as transitionally reformed sections 14a, 14b either side of fully reformed section 16. FIG. 9 shows a reformed section of inner pipe 2 before the application of any reinforcing material. Positioned on the fully reformed section 16 are one or more devices 18a, 18b. The device or devices 18a, 18b may be electronic devices. For example, the device or devices 18a, 18b may be an acoustic or electromagnetic transmitter and/or receiver. The purpose of the device or devices 18a, 18b may be to measure characteristics of the fluid flow, to measure the type of fluid within the fluid conduit 40 or the like. The device or devices 18a, 18b may be in some way attached to the fully reformed section 16 of the inner pipe 12. The flat surfaces 20, 22 of the fully reformed section may facilitate a simpler connection of device or devices 18a, 18b. FIGS. 9A, 9B and 9C are cross sectional views of sections A-A, B-B and C-C respectively. FIGS. 9A and 9C show that the cross section of the inner pipe at sections A-A and C-C remains substantially circular, while cross section B-B is an oblong shape. The cross sectional flow area of the inner pipe 2 at sections A-A, B-B and C-C is substantially similar. The substantially similar flow area of the inner pipe 2 at sections A-A, B-B and C-C minimises the disruption to the fluid flow in the reformed section of inner pipe 16. The oblong form of section B-B assists to minimise the length of the transmission path of a signal which may be communicated between devices 18a, 18b. In minimising the length of the transmission path, a received signal may be clearer, for example by being subject to lower energy losses, attenuation or the like.

A method of application of a tape of composite material 30 including both a matric material and embedded reinforcing fibres is shown in FIG. 10. In the illustrated example, the tape 30 is applied to both the non-reformed and reformed sections of the inner pipe 2. In this embodiment, a heat source 32 raises the temperature of the initial point of contact between the inner pipe 2 and the composite material. This may assist to bond the composite material to the inner pipe 2. The mechanism by which the heat source 32 may assist in the bonding of the composite material to the inner pipe 2 may be localised melting and fusing of the material of the inner pipe 2. As the tape 30 is applied to the surface of the inner pipe 2, the region of the inner pipe 2 to which heat is applied may change. Upon the application of the tape 30 to the inner pipe 2, the tape 30 and the inner pipe 2 are pressed together for example by a roller (not shown). This process assists to fix the devices 18a, 18b in place within the fully reformed section 16 of the inner pipe 2.

Referring to FIG. 11, illustrated is a cross sectional view through the fully reformed section 16 of a fluid conduit 40. Fluid conduit 40 comprises the inner pipe 2 with fibre reinforced composite material 34 fully applied to the inner pipe 2. The devices 18a, 18b are fully embedded in the fibre reinforced composite material 34. The exterior surface 36 of the fluid conduit 40 contains a gradual curve and there is no external stepped region as a result of a device 18a, 18b being embedded within fluid conduit 40. Although shown embedded within fluid conduit 40, it is possible to attach the devices 18a, 18b to the outside surface of the fluid conduit 40. In this embodiment, the devices 18a, 18b are attached after the application of some or all of the fibre reinforced composite material 34. Application of the fibre reinforced composite material 34 such that there is a smooth transition on the outer surface of the fluid conduit 40 may provide the fluid conduit 40 with preferential characteristics, for example it may be easier to wind or handle or it may be easier to store. If, for example, the fluid conduit 40 is used in downhole oil and gas operations, the pipe may experience fluid flow over its exterior surface 36 and a removed stepped region may facilitate flow over the surface of the fluid conduit 40.

In alternative embodiments of the invention, the reformed section 16 of the inner pipe 2 is formed such that it comprises different cross sectional shapes and areas to the one described above. Some examples of alternative possibilities are presented below.

An alternative embodiment of the invention is shown in FIG. 12. The components of this section are generally similar to those of FIG. 9. As such, the reference numerals are the same, but augmented by 200. FIG. 12 illustrates the fully reformed section 216 of an inner pipe 202 is shown in FIG. 12. In this embodiment, fully reformed section 216 is oval in shape, as shown in section E-E, while non-reformed sections of pipe 217a, 217b have substantially circular cross sections as shown in section D-D and section F-F. In this embodiment, the flow area of the fully reformed section 16 is substantially the same as the flow area of the adjacent non-reformed sections of pipe 217a, 217b. Transitionally reformed sections 214a, 214b of the inner pipe 202 have been reshaped appropriately to provide a gradual transition between the non-reformed sections 217a, 217b and the fully reformed section 216. In this embodiment as well as others, the inner pipe 202 is reformed first to permit the mounting of an external device (not shown). After the mounting of an external device (not shown) fibre reinforced composite material is applied to produce a fluid conduit 240 which may have multiple forms and/or features.

FIG. 13 illustrates a further alternative embodiment of the invention generally similar to that of FIG. 9. As such, the reference numerals are the same, but augmented by 300. FIG. 13 illustrates a reformed section of inner pipe 302 wherein the fully reformed section 316 is a geometrically similar shape to the adjacent non-reformed sections 317a, 317b, but with a reduced flow area. The cross sectional shape of each non-reformed section of inner pipe 317a, 317b is more clearly shown in sections G-G and J-J respectively. The cross sectional shape of the fully reformed section 316 of inner pipe 302 is shown in section H-H. In the embodiment shown, the reformed section of inner pipe 2 may have a number of uses, for example it may function as a venturi flow meter. That is, flow may have a higher pressure and lower velocity in non-reformed sections 317a, 317b of the inner pipe 302 and a lower pressure and higher velocity in the fully reformed section 316 of the inner pipe 302. Devices 342, 344, 346 are shown attached to the internal surface of the inner pipe 302, although it may alternatively be permissible to attach devices 342, 344, 346 to the outer surface of the inner pipe 302. Such devices may be used to measure the pressure of the fluid flow and/or the velocity of the fluid flow. The device may be, for example, a static pressure port, a strain gauge or a positive displacement meter. Similar to other embodiments, transitionally reformed sections 314a, 314b may be appropriately formed such that the cross sectional form of the inner pipe 2 gradually transitions from that of the adjacent non-reformed sections 317a, 317b of inner pipe to that of the fully reformed section 316. Although transitionally reformed sections 314a, 314b are shown in FIG. 13 as having substantially inversely identical transitions from the non-reformed sections 317a, 317b of the inner pipe to the fully reformed section 316, this need not be the case. It may be possible for, for example, transitionally reformed section 314a to provide a sudden transition, while transitionally reformed section 314b provides a more gradual transition.

Figure 14:
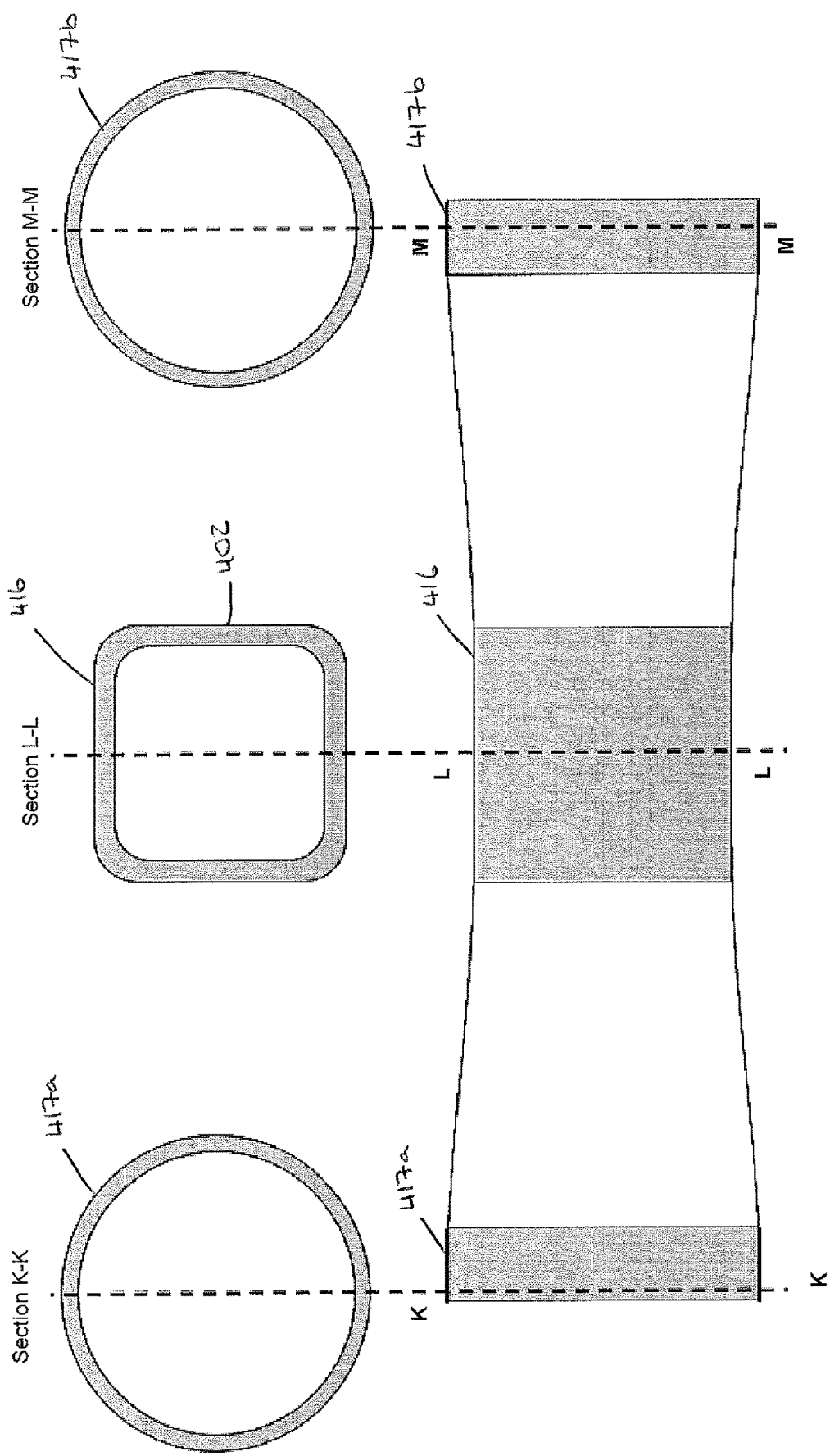
FIG. 14 shows elevation and cross sectional views A-A, B-B and C-C of a moulded inner pipe according one embodiment of the invention.

A further alternative embodiment of a reformed section of inner pipe is illustrated in FIG. 14. This embodiment of the invention is generally similar to that shown in FIG. 9. As such, the reference numerals are the same, but augmented by 400. Similar to previous embodiments, adjacent non-reformed sections 417a, 417b of the inner pipe 402 have a generally circular cross sectional form, as shown in sections K-K and M-M. Fully reformed section 416 has a generally square cross-sectional shape, as illustrated in section L-L. FIG. 14 illustrates an exemplary embodiment in which the flow area and flow shape of fully reformed section 416 may both be different from the flow shape and flow area of adjacent non-reformed sections 417a, 417b of inner pipe 402.

Figure 15:
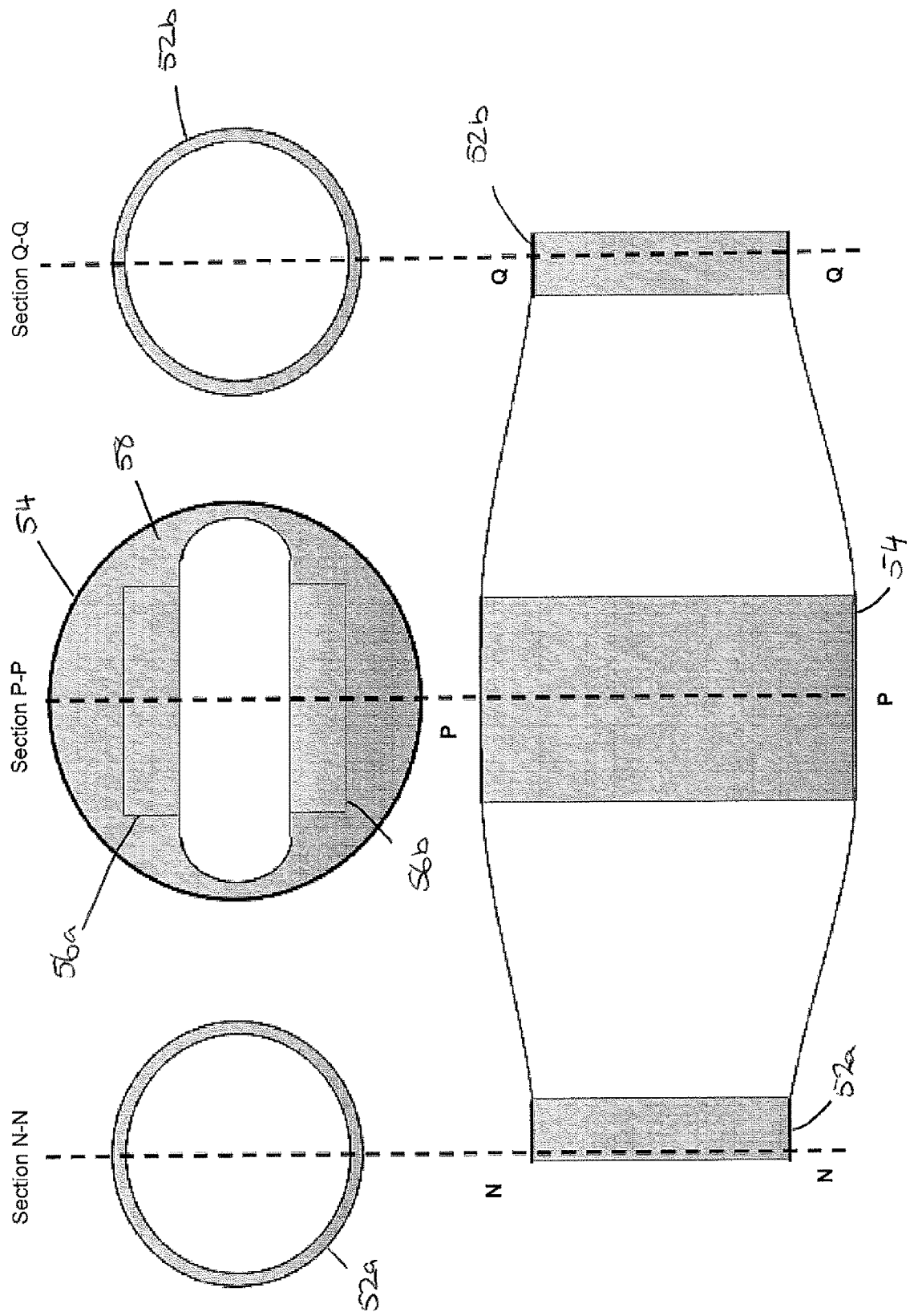
FIG. 15 shows elevation and cross sectional views A-A, B-B and C-C of a composite fluid conduit according to one embodiment of the invention.

An embodiment of a reformed section of fluid conduit 50 is illustrated in FIG. 15. The inner pipe 2 of the embodiment shown is similar to that of FIG. 9. The flow area of the non-reformed sections of inner pipe 2 is substantially similar to the flow area of the fully reformed section of inner pipe 2. The non-reformed sections of fluid conduit 52a, 52b, have generally circular cross sections as shown in section N-N and Q-Q respectively. The fully reformed section 54 of the fluid conduit 50 is also generally circular in cross section as shown in section P-P. The outer diameter of the reinforced fully reformed section 54 of fluid conduit 50 is larger than the outer diameter of the non-reformed cross sections 52a and 52b. The reinforced fully reformed section 54 of the fluid conduit 50 comprises an oblong section of inner pipe 2 upon which two devices 56a, 56b have been mounted. Devices 56a and 56b may be electrical devices, for example acoustic and/or electromagnetic sensors and/or transmitters, and may be used to measure characteristics of fluid flow within the fluid conduit 50. Fibre reinforced composite material 58 is applied to the surface of inner pipe 2. Devices 56a and 56b are bound to the inner pipe 2 and embedded within the fluid conduit 50 as a result of the application of the fibre reinforced composite material 58. In some uses, having a reinforced fully reformed section 54 of the fluid conduit 50 with a larger diameter than a non-reformed section 52a, 52b, may provide some advantages. For example, if fluid conduit 50 were located within a cylindrical casing (e.g. in a wellbore), the wider section may act as a centraliser to limit the lateral movement of fluid conduit 50 within the casing.

Figure 16:
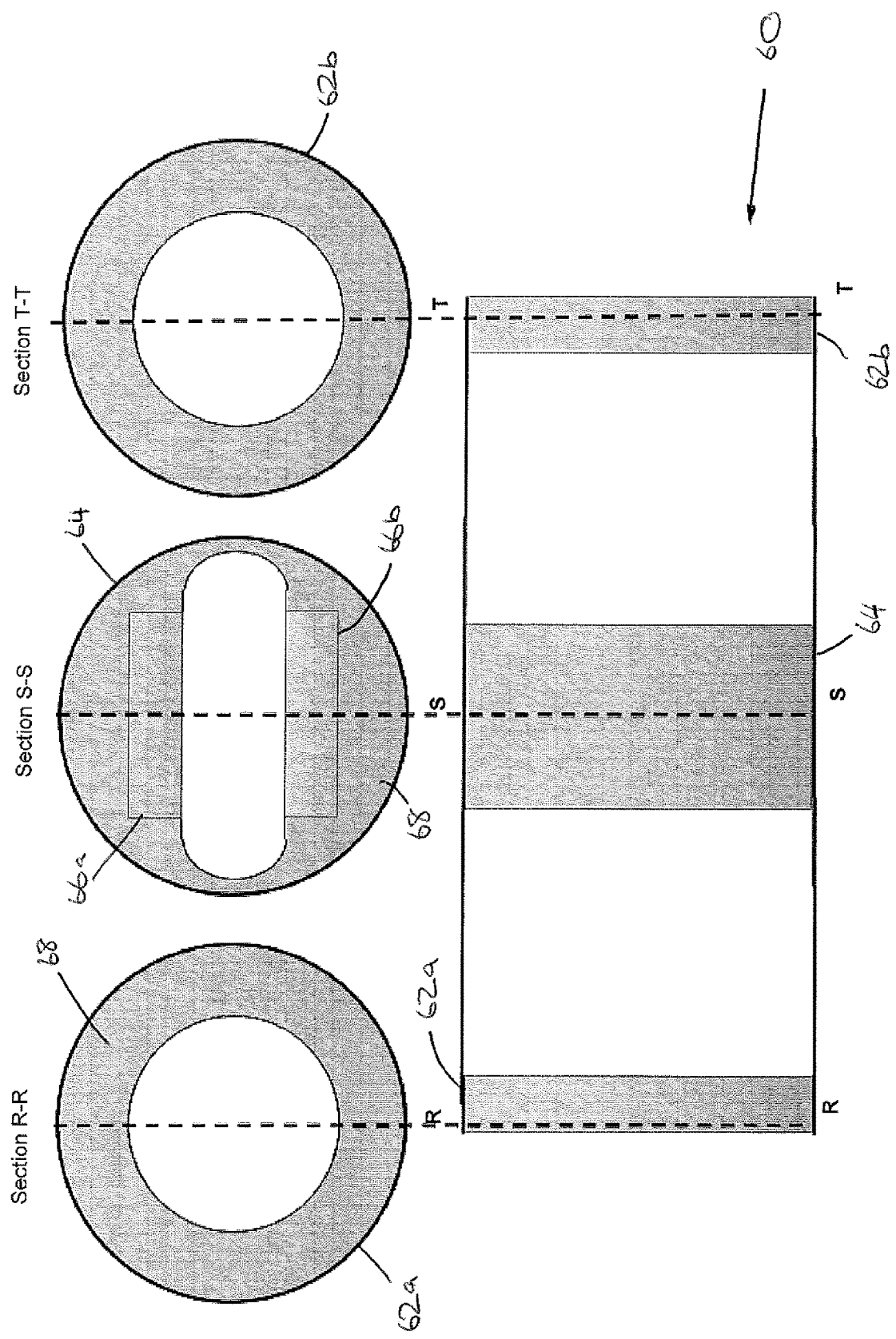
FIG. 16 shows elevation and cross sectional views A-A, B-B and C-C of a composite fluid conduit according to a second embodiment of the invention.

A further embodiment of a reformed section of fluid conduit 60 is shown in FIG. 16. In this embodiment, the inner pipe 2 is similar to that shown in FIGS. 9 and 15. The flow area of the non-reformed sections of inner pipe 2 is substantially similar to the flow area of the fully reformed section of inner pipe 2. The non-reformed sections of fluid conduit 62a, 62b, have generally circular cross sections as shown in section R-R and T-T respectively. The reinforced fully reformed section 64 of the fluid conduit 60 is also generally circular in cross section as shown in section S-S. Fibre reinforced composite material 68 has been applied along the length of the inner pipe 2 such that the outer diameter of both non-reformed sections 62a, 62b and reformed section 64 is substantially similar. The reinforced fully reformed section 64 of the fluid conduit 60 comprises an oblong section of inner pipe 2 upon which two devices 66a, 66b have been mounted. Devices 66a and 66b may be electrical devices, for example sensors and/or transmitters, and may be used to measure characteristics of fluid flow within the fluid conduit 60. A fluid conduit with a constant outer diameter as shown in FIG. 16 may reduce stress concentrations within the fluid conduit when under loading.

Figure 17:
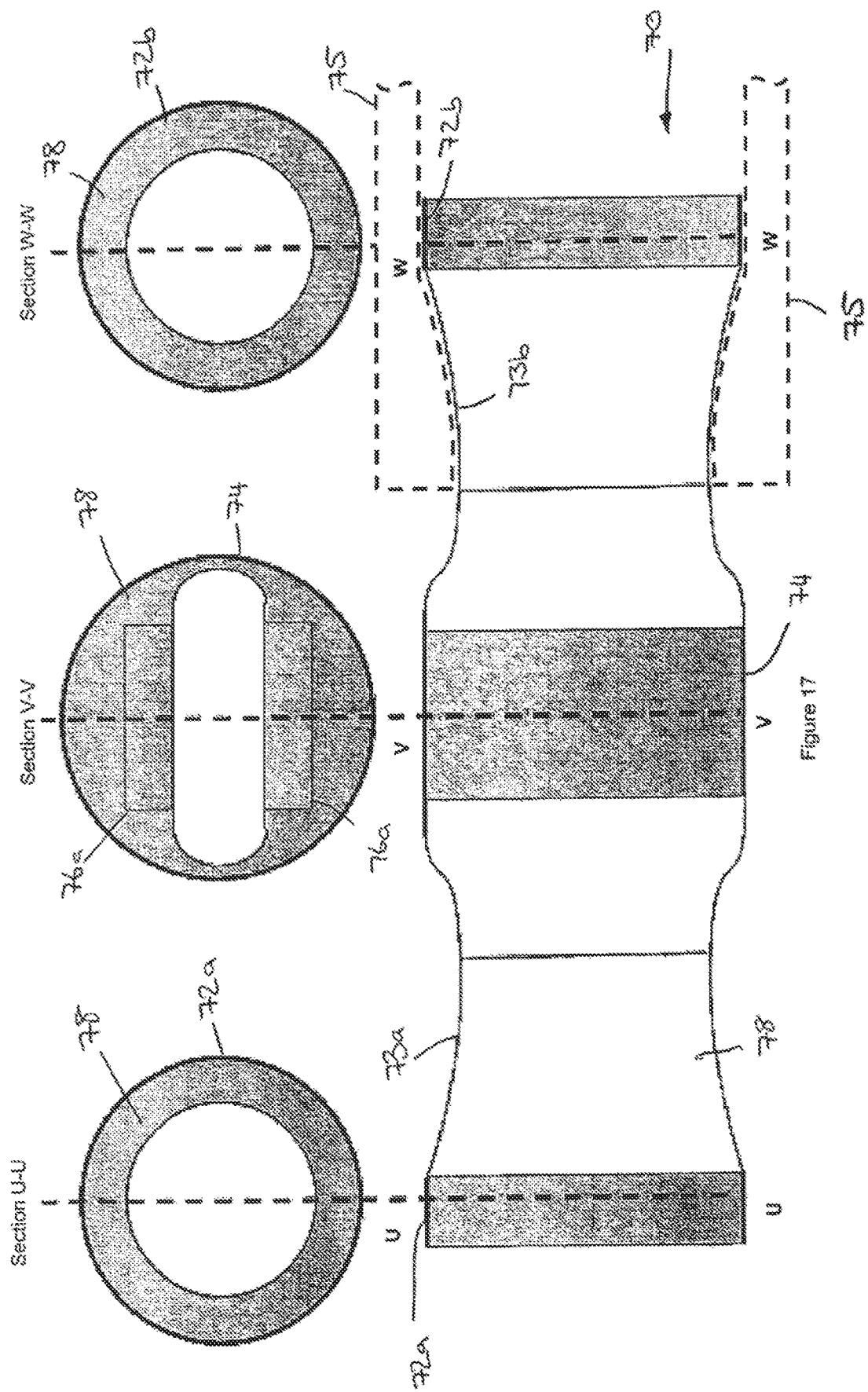
FIG. 17 shows elevation and cross sectional views A-A, B-B and C-C of a composite fluid conduit according to a third embodiment of the invention.

The embodiment shown in FIG. 17 is of a reformed section of fluid conduit 70. The fluid conduit 70 is largely similar to that of FIGS. 15 and 16. In this embodiment, the reinforced composite material 78 is applied such that the outer diameter of the fully reformed section 74 is substantially similar to non-reformed sections 72a, 72b. As with the embodiments of FIGS. 15 and 16, fully reformed section 74 comprises two devices 76a and 76b which may be attached or bound to the reformed section of the inner pipe 2. Reformed section of fluid conduit 70 comprises two transitional sections of reduced diameter 73*a*, 73*b*. The reduced diameter of transitional sections 73*a*, 73*b* may be due to there being less fibre reinforced composite material 78 applied to these regions. Alternatively, the fibre reinforced composite material 78 may have been applied and then selectively removed (e.g. machined) from the external surface of the fluid conduit 70. The removal of the fibre reinforced composite material from the external surface of the fluid conduit 70 may create a geometric feature to which an object or device may be attached. For example, the geometric feature towards the end of a section of fluid conduit may permit the attachment of a collar 75. The collar 75 may facilitate the attachment of the composite fluid conduit to an external device.

An alternative embodiment of a method for forming a composite fluid conduit is illustrated in FIGS. 18 to 21. In this embodiment, a mould 82 is configured such that it is able to be pressed against the internal surface one end of an inner pipe 93. The mould contains a moulding surface 84, heating elements 86, temperature sensor 83, controller 87 and communication line 85. Moulding surface 84 is configured such that when applied to the internal surface of inner pipe 93, it reforms the end of the inner pipe such that it is flared. Although shown in this embodiment as mould which may reform the end of an inner pipe 93 through application to its inner surface, there may be alternative embodiments wherein the mould is applied to the outer surface of the inner pipe 93.

Figure 18:
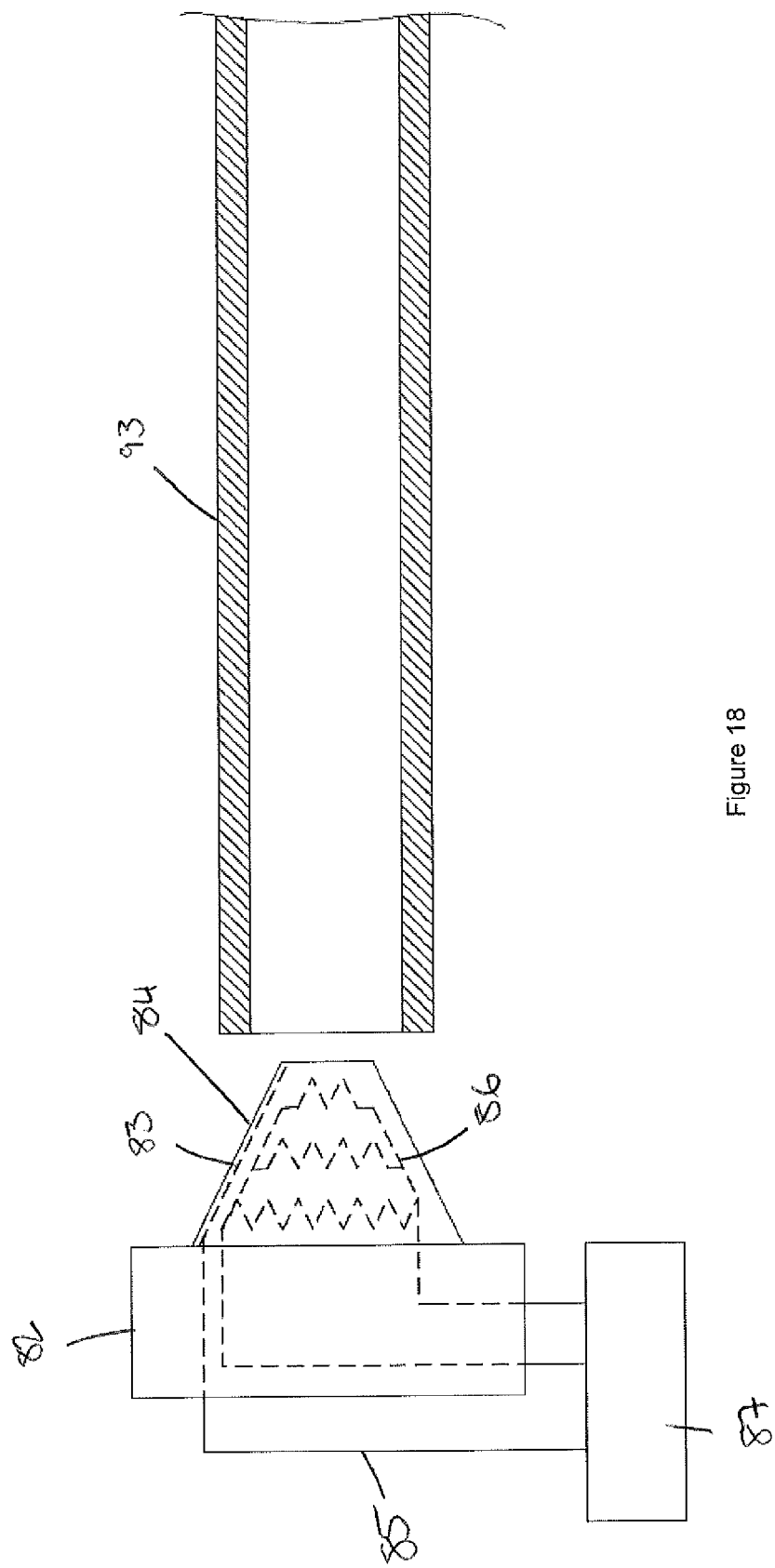
FIG. 18 is an elevation of an end section of inner pipe and mould according to one embodiment of the invention.
Figure 19:
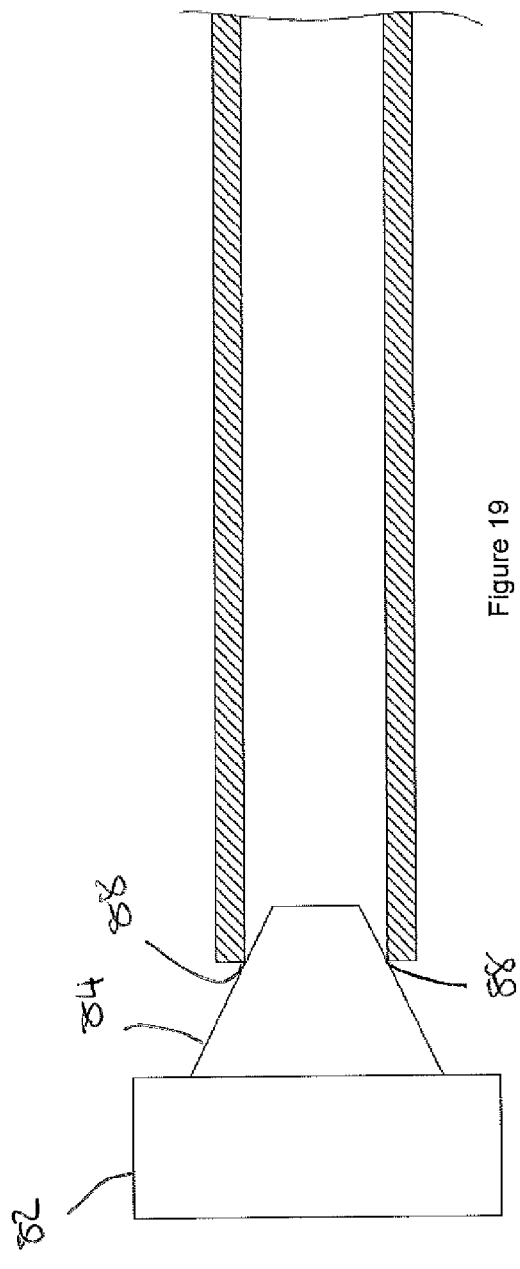
FIG. 19 is an elevation showing the initial contact between an end section of inner pipe and a mould.
Figure 20:
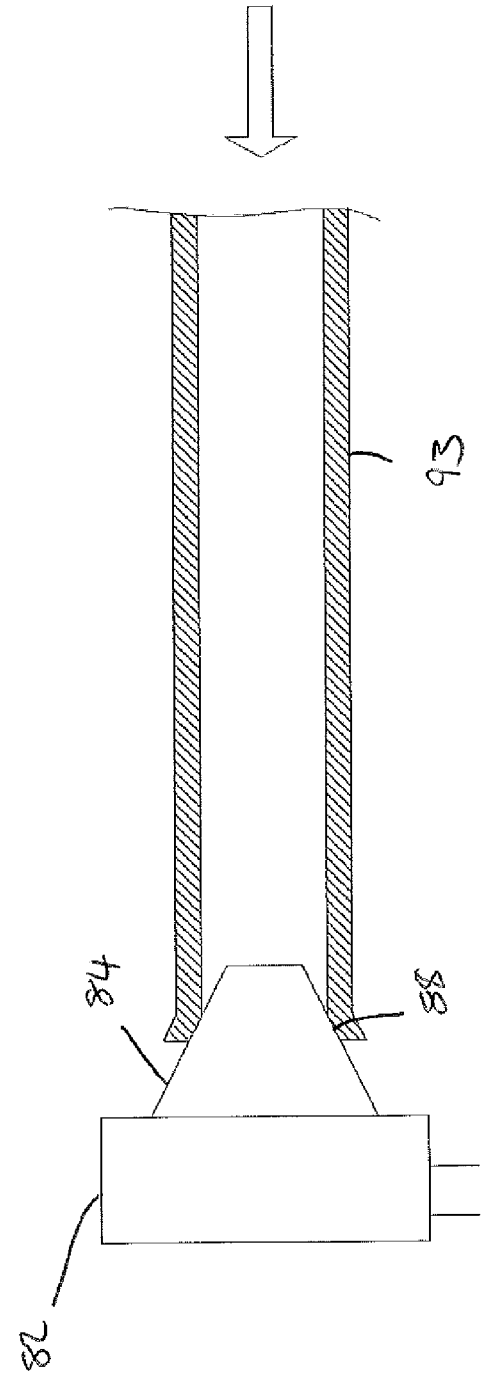
FIG. 20 is an elevation of a mould and partially moulded end section of inner pipe.
Figure 21:
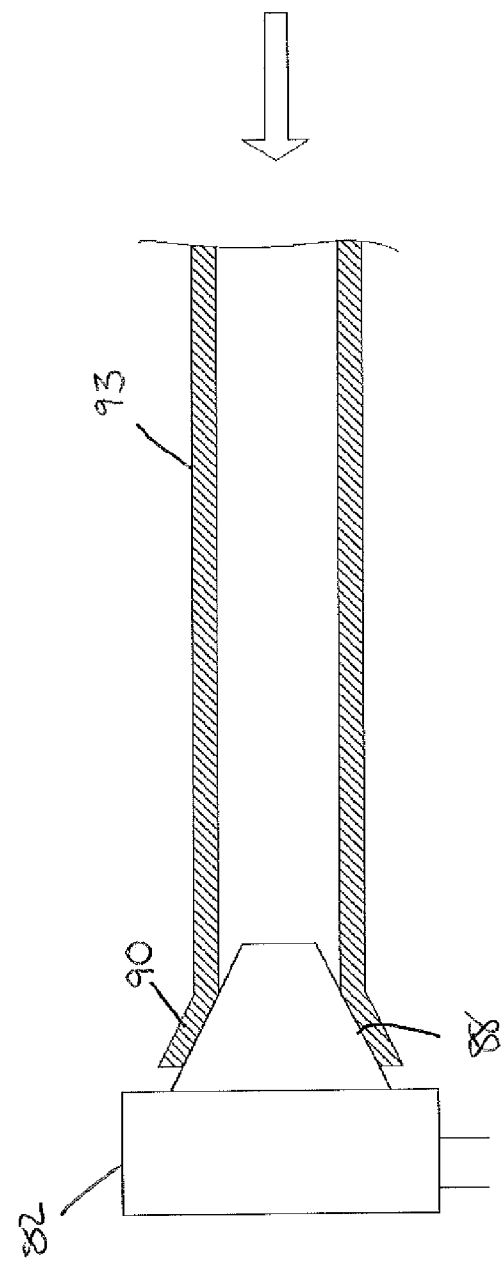
FIG. 21 is an elevation of a mould and moulded end section of inner pipe.

FIGS. 19 to 21 depict stages in the method as first described in FIG. 18. In one embodiment of the invention the inner pipe 93 is preheated by an external source (not shown) which may be, for example, a flame or heated air. Inner pipe 93 is heated in a controlled manner.

The inner pipe 93 is heated by contact or close proximity with the mould 82. The mould 82 is heated by a heating element 86. The mould 82 heats the inner pipe 93 to a desired temperature. The temperature is, in this case, between the glass transition temperature and the melting temperature of the polymer from which it is formed. The temperature is selected such that the material of the inner pipe 93 softens and can be easily moulded. This temperature is, in this case, around 300° C.

In an alternative embodiment of the invention, the inner pipe 93 is heated to a desired temperature before contacting mould 82. The mould 82 may be heated by any appropriate means, for example by an external heat source such as a flame or heated air, and/or it may comprise an internal heating mechanism such as heating element 86.

The moulding surface 84 makes an initial point of contact with the internal surface of the inner pipe 93 at point 88. Pressure is applied to one end of the inner pipe 93 in the direction of the arrow shown in FIG. 20. The end portion of the inner pipe 93 begins to reform as defined by the shape of the moulding surface 84. The point of contact 88 with the inner pipe 93 increases in area as the end portion of the inner pipe 93 reforms. A controller (not shown) applies pressure to the inner pipe 93 in a controlled manner such that there is a steady reformation rate. The reformation rate is, in this case, 3 mm/min. The precise rate may be chosen to permit efficient reforming of a section of inner pipe 93, without damaging the material of the inner pipe 93. In this embodiment, the inner pipe 93 reforms such that the end portion contains a flared section 90. FIG. 21 illustrates that as the application of pressure on the inner pipe 93 continues, the flared section 90 continues to reform, and the point of contact 88 continues to increase in area.

The mould 82 applies a specific temperature to the inner pipe 93 for a predetermined period of time without substantial reformation. The specific temperature applied to the inner pipe 93 for a predetermined period of time without substantial reformation may be a relaxation temperature. The predetermined period of time is, in this case, 30 minutes. In this embodiment of the invention, the temperature applied to the inner pipe 93 is lower than the temperature applied during reformation. In this case, the relaxation temperature is around 60° C. This temperature may be selected such that it is below the glass transition temperature of the material of the inner pipe. Holding the inner pipe 93 at a relaxation temperature and relaxation pressure for a predetermined period of time allows, in this case, internal stresses within the material of the inner pipe 93 to be dissipated.

After applying the mould 82 to the inner pipe 93 for a predetermined period of time, the inner pipe 93 and the mould 82 are separated. The inner pipe 93 is allowed to cool. The inner pipe 93 may be allowed to cool naturally or forced cooling may be applied, for example by a fan.

Figure 22:
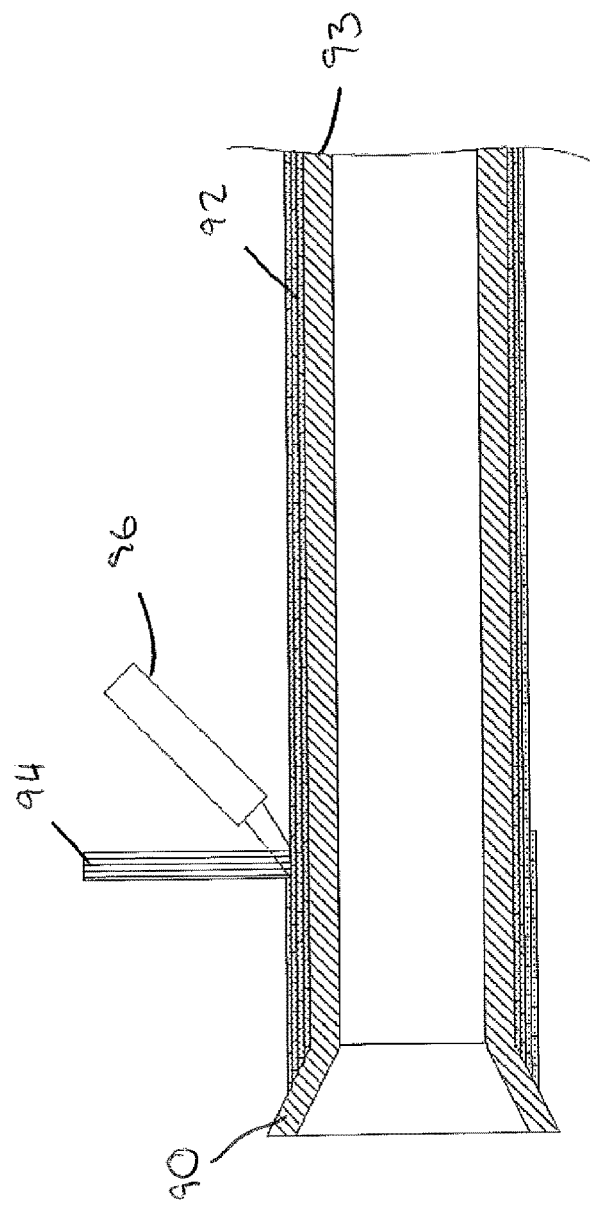
FIG. 22 shows the application of composite fibres to a section of inner pipe with a reformed end section, according to one embodiment of the invention.

Illustrated in FIG. 22 is the application of a fibre reinforced composite material 92 to an internal pipe 93 with a flared section 90. Similar to the method shown in FIG. 10, a tape of composite material 94 is applied to the surface of the inner pipe 93. A heat source 96 is used to permit bonding of the composite material to the inner pipe as it is applied. During application of the tape of fibre reinforced composite material 94, pressure is applied to the surface.

Figure 23:
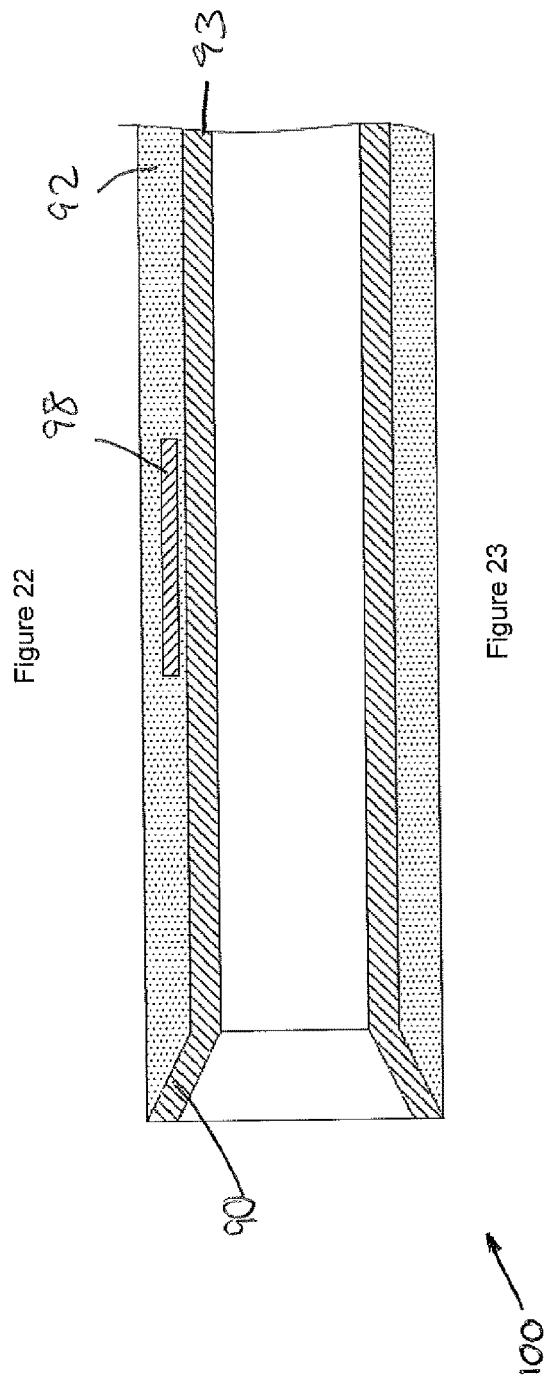
FIG. 23 is a cross sectional view of a composite fluid conduit with a reformed end section and which comprises an embedded device.

FIG. 23 is a cross section of a section of fluid conduit 100 which comprises a flared section 90 and a device 98 which has been embedded in fibre reinforced composite material 92. The device may be an electrical device such as a sensor and/or transmitter and may be used to measure characteristics of fluid flow, for example. The flared section 90 of the fluid conduit 100 may assist in the connection of the fluid conduit to an external device. A method of such a connection is illustrated in FIG. 24.

Figure 24:
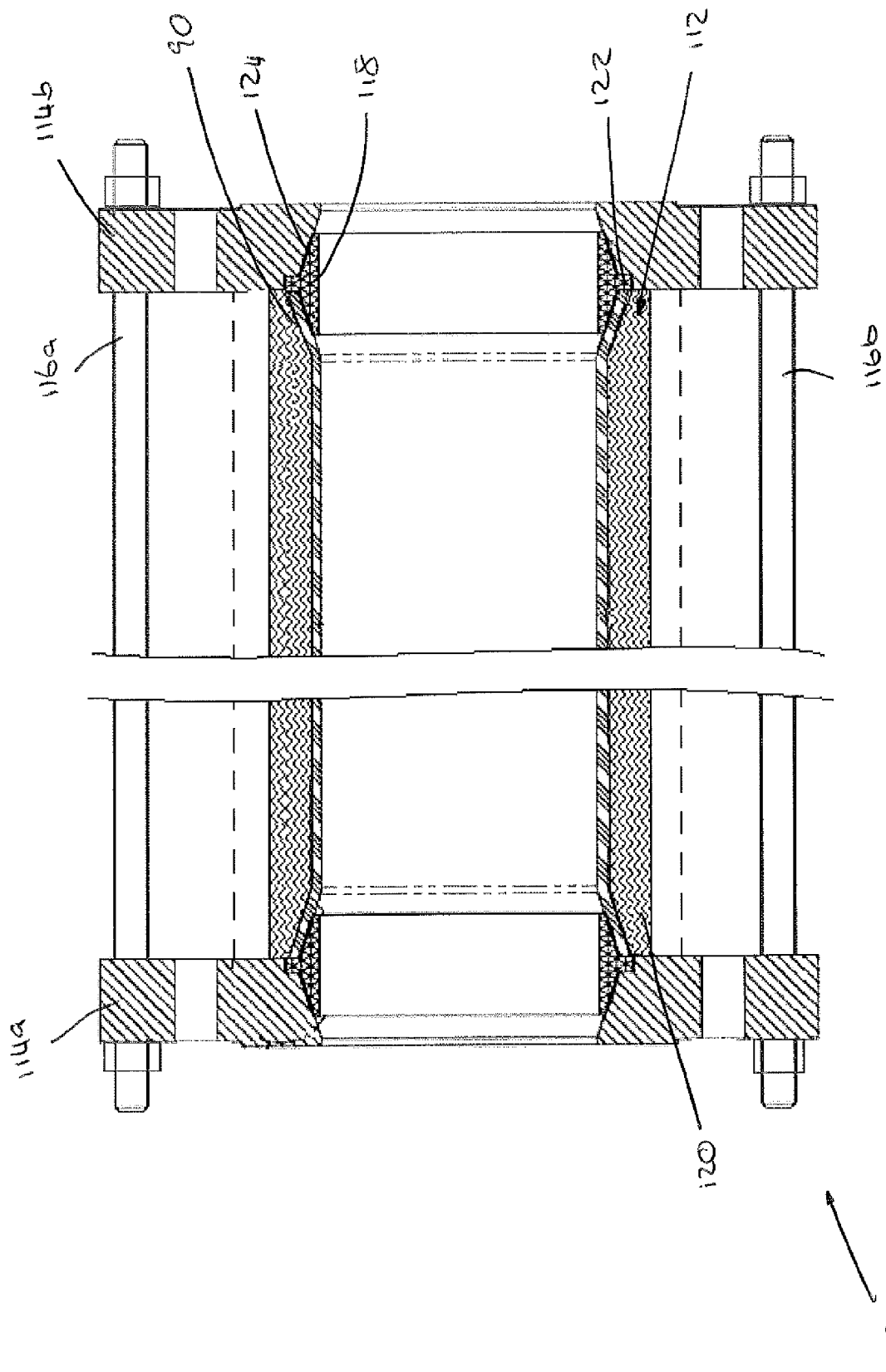
FIG. 24 is a cross sectional view of a composite fluid conduit and flange assembly.

FIG. 24 is a cross sectional view of a fluid conduit and flange assembly 110. Shown is a section of reinforced fluid conduit 112 which is enclosed between two flanges 114*a*, 114*b* which are attached together by tie rods 116*a*, 116*b*. The flared end 90 of the fluid conduit 112 allows for the installation of a ring type seal 118 between flanges 114*a*, 114*b* and the fluid conduit 112. The ring type seal 118 also comprises a rib 122. Tie rods 116*a* 116*b* assist to compress the flange 114*a*, 114*b* against the flared end 90 of the fluid conduit 112. The flared end 90 and the geometry of sloping flange surface 124 allow the ring type seal 118 and rib 122 are located between the flange 114*a*, 114*b* and the flared end 90 of the fluid conduit 112, and create a seal between the flange 114*a*, 114*b* and the fluid conduit 112. Holding the fluid conduit 112 in this configuration may allow a section to be easily inserted between two external devices or other sections of fluid conduit. An application of this may be to use the section of composite fluid conduit with an embedded device (not shown) as a measuring device. In the configuration shown in FIG. 24, the device may be a sensor or transmitter able to measure aspects of the fluid flow.

As illustrated in FIG. 24, the material of the inner surface of the fluid conduit is the same as that of the inner pipe 102. The reinforced composite material 120 features only on the outer surface of the fluid conduit 112. This configuration may assist to prevent leakage of a fluid through the wall of the fluid conduit through leak paths introduced by bonding the reinforced composite material 120 to the inner pipe 102.

To provide additional support to the composite fluid conduit 112, tie rods 116a, 116b may provide a degree of longitudinal pre-compression to the composite fluid conduit 112. In applications where the fluid conduit and flange assembly 110 may be subject to external forces, which may apply longitudinal tensional stresses to the fluid conduit 112, the longitudinal pre-compression applied by tie rods 116a, 116b may function to protect the composite fluid conduit from damage.

One of ordinary skill in the art will appreciate that various modifications may be made to the foregoing embodiments. For example, with reference to the description of FIGS. 5 to 8, the step of pre-heating the inner pipe 2 before engagement with the external moulding device 1 may be omitted. In such a method, the external moulding device 1 may apply heat to the inner pipe 2 before applying pressure to the inner pipe 2. Alternatively, the pipe 2 may be pre-heated before engagement with the external moulding device 1 and the external moulding device 1 may then apply pressure to the inner pipe 2 without applying any heat to the inner pipe 2.

Further, in the embodiments described above, the inner pipe is provided in a first form and then some reforming is undertaken to achieve a desired shape. However, in other embodiments the inner pipe may be initially provided with the desired shape, such that no reforming is necessary.

The invention claimed is:

1. A method for forming a composite fluid conduit having a variation in cross-section between at least two different longitudinal sections thereof, comprising:
   providing a continuous section of inner pipe comprised of a thermoplastic material, completely devoid of reinforcing fibers, having a variation in cross-section between at least two different longitudinal sections thereof; and
   applying a fibre reinforced composite material to the inner pipe, the composite material is comprised of a thermoplastic polymer matrix material and one or more reinforcing fibres embedded within the matrix material, the method comprising providing the inner pipe in a first form and then reforming the inner pipe to create a reformed pipe section having a desired shape prior to applying any fibre reinforced composite material to cover the at least two different longitudinal sections thereof, wherein the reformed pipe section provides a variation in cross-section between at least two longitudinal sections of the inner pipe and wherein the inner pipe is re-formed using heat in the form of a laser, the variation in cross-sectional shape along the reformed inner pipe defines an attachment surface which facilitates the attachment of a device to the reformed inner pipe;
   the method additionally comprising fusing the composite material to the inner pipe to create a substantially monolithic structure, extending substantially continuously between the inner pipe and the composite material.

2. The method according to claim 1, comprising applying the fibre reinforced composite material in the form of a tape which includes a matrix material and reinforcing fibres to the inner pipe.

3. The method according to claim 1, wherein the variation in cross-section between at least two longitudinal sections of the inner pipe includes a variation in cross-sectional area.

4. The method according to claim 1, wherein the variation in cross-section between at least two longitudinal sections of the inner pipe includes a variation in cross-sectional shape.

5. The method according to claim 1, comprising forming or manufacturing the inner pipe to have a variation in cross-section between at least two different longitudinal sections thereof.

6. The method according to claim 1, comprising heating the inner pipe to a temperature between the glass transition temperature and melting point of the inner pipe material.

7. The method according to claim 1, comprising heating the inner pipe to a first predetermined temperature and holding the inner pipe at this first predetermined temperature for a first period of time.

8. The method according to claim 7, comprising subsequently heating or cooling the inner pipe to a second predetermined temperature and holding the inner pipe at this second predetermined temperature for a second period of time.

9. The method according to claim 1, comprising forming or reforming the inner pipe by applying a pressure to a surface of the inner pipe.

10. The method according to claim 1, comprising forming or reforming the inner pipe by both heating and applying pressure to a surface of the inner pipe.

11. The method according to claim 1, comprising forming or reforming the inner pipe using a forming apparatus.

12. The method according to claim 11, comprising using the forming apparatus to apply heat and/or pressure to a section of the inner pipe so as to form or reform the section of the inner pipe.

13. The method according to claim 1, comprising retaining at least one section of inner pipe with an original geometry.

14. The method according to claim 1, wherein the inner pipe is provided with a variation in cross-section to comprise a flat or substantially flat attachment surface.

15. The method according to claim 1, comprising providing a variation in cross-section along the inner pipe such that the distance between opposing wall regions of the inner pipe at a longitudinal section is reduced.

16. The method according to claim 15, wherein the reduced distance between opposing wall regions permits a signal to travel along a shorter transmission path between the opposing wall regions.

17. The method according to claim 15, wherein the opposing wall regions accommodate respective transmission and receiving devices for transmitting and receiving a signal.

18. The method according to claim 1, comprising applying a fibre reinforced composite material to the inner pipe, and then reforming at least a portion of the inner pipe.

19. The method according to claim 1, wherein the fibre reinforced composite material comprises at least a matrix material and one or more reinforcing fibres embedded within the matrix material.

20. The method according to claim 1, comprising using a material of inner pipe which is the same as a matrix material of the fibre reinforced composite material.

21. The method according to claim 1, comprising mounting a device to the composite fluid conduit.

22. The method according to claim 1, comprising mounting a device to the inner pipe prior to applying the fibre reinforced composite material.

23. The method according to claim 1, comprising attaching a device after the application of some or all of the fibre reinforced composite material.

24. The method according to claim 1, comprising forming the composite pipe to include a geometric feature which facilitates the attachment of an external device.

25. The method according to claim 24, wherein the external device comprises a connector for use in providing connection to another structure.

* * * * *